United States Patent [19]

Done

[11] Patent Number: 4,630,242
[45] Date of Patent: Dec. 16, 1986

[54] ADAPTIVE AND NON-ADAPTIVE METHOD FOR ESTIMATING THE EARTH'S REFLECTION SEQUENCE

[75] Inventor: William J. Done, Tulsa, Okla.

[73] Assignee: Amoco Corporation, Chicago, Ill.

[21] Appl. No.: 363,721

[22] Filed: Mar. 30, 1982

[51] Int. Cl.$^4$ .............................................. G01V 1/36
[52] U.S. Cl. ...................................... 367/73; 367/43; 367/45; 367/42; 364/421
[58] Field of Search ....................... 367/73, 45, 42, 63, 367/35, 40, 42; 364/421, 158, 164, 553, 724, 148–151

[56] References Cited

U.S. PATENT DOCUMENTS

| 4,030,141 | 6/1977 | Graupe ................................. | 364/178 |
| 4,054,780 | 10/1977 | Bartley et al. ...................... | 364/164 |
| 4,455,612 | 6/1984 | Girgis et al. ......................... | 364/492 |
| 4,523,714 | 6/1985 | Isermann .............................. | 364/505 |

OTHER PUBLICATIONS

"A Survey of Learning Control Systems," Jerry Mendel, ISA Transactions, Jul. 1966, pp. 297–303.
"Investigations Into Model-Reference Adaptive Control Systems," Proc. IEE, vol. 111, #11, 11/64, pp. 1894–1906.
Lines et al., "A New Approach to Vibroseis Deconvolution" Geophysical Prospecting, vol. 25, pp. 417–433, 9/77.
"Intrepretation of Synthetic Seismograms," Sengbush et al., Geophysics, vol. 26, #2, Apr. 1961, pp. 138–157.
Klauder et al., "Theory and Design of Chirp Radars," 7/60, Bell Syst. Tech. J, v25, pp. 261–278.
Anstey, "Correlation Techniques-A Review," Geophysical Prospecting, 6/64, pp. 355–382.
Widrow et al., "Adaptive Noise Cancelling: Principles & Applications," IEEE, vol. 63 #12, 12/75, p. 1692.
Robinson, E. A., Multichannel Time Series Analysis with Digital Computer Programs, 1967.
"The Weiner RMS Error Criterion in Fitter Design and Prediction," N. Levinson, J. Math Physics, v.25, 1947, pp. 261–278.
"Intrepretation of Vel. Spectra. Through an Adaptive Modeling Strategy," Davis, Geophysics, v.37, #6, 12/72, pp. 953–962.
"Identifier of an Unknown Process," Smith, Proc. of IFAC Tokyo Symposium, 1965, pp. 255–264.

Primary Examiner—Nelson Moskowitz
Assistant Examiner—Ian J. Lobo
Attorney, Agent, or Firm—Timothy D. Stanley

[57] ABSTRACT

A method is disclosed for estimating the impulse response of the earth from Vibroseis data. Based on a time domain system identification approach, the earth's impulse response is estimated by operating on the seismic trace data and the vibrator pilot. Two implementations are discussed. The first is an adaptive method using a sliding data window and the uncorrelated trace data. Preferably, the process used to control the adaptation is the fast Kalman estimation (FKE) technique. This technique, based on recursive least squares, has a fast convergence rate and desirable computational requirements. The second implementation is non-adaptive. It uses the Levinson recursion technique to compute the Wiener filter solution based on the pilot autocorrelation function and the correlated trace data. Simulations demonstrate the capability of the system identification model to resolve reflection events.

15 Claims, 17 Drawing Figures

ADAPTIVE AND NON-ADAPTIVE METHOD FOR ESTIMATING THE EARTH'S REFLECTION SEQUENCE

BACKGROUND OF THE INVENTION

This invention relates to geophysical exploration for petroleum and minerals. More particularly, this invention is directed to geophysical prospecting by means of the seismic technique, whereby mechanical or seismic energy is imparted to the earth and the resulting seismic wave which propagates through the earth is reflected at the interfaces of different subsurface geological formations, the seismic reflections are detected, and the seismic reflection data are later processed in order to map the subsurface geological structure. Specifically, this invention is directed to methods and apparatus for analyzing the seismic data in cases where a vibrator is used for imparting seismic energy to the earth, commonly referred to in the field to which this invention relates as "Vibroseis ®".

In the Vibroseis ® geophysical exploration technique, a frequency modulated signal is employed as the source of seismic energy. This signal is commonly referred to as a sweep and for most operations is modulated such that its instantaneous frequency is a linear function of time. The electrical signal or pilot which establishes the oscillations in the vibrator's driving element is routinely recorded for later processing steps.

Ideally, each receiver on the surface of the earth records seismic data consisting of two components: (1) the convolution of the sweep signal with the earth's impulse response and (2) additive noise. The resulting seismic data are usually referred to as an uncorrelated trace. In accordance with the conventional processing technique, the traces from each receiver are cross-correlated with the pilot. See N. A. Anstey, "Correlation Techniques-A Review", *Geophys. Prosp.*, v. 12, pp. 355-382, 1964. The resulting outputs are referred to as correlated traces. Seismic reflection events are then determined from the correlated traces, just as they would be determined from an impulsive source trace.

The Vibroseis ® geophysical exploration technique is similar in principle to chirp radar systems. See J. R. Klauder, A. C. Price and S. Darlington, "The Theory and Design of Chirp Radars", *Bell Syst. Tech. J.*, v. 25, pp. 261-278, 1960. A low power, long duration signal is used as the system input. Input pulse compression is then achieved by correlating the received signal with the input pulse. Correlating the seismic data with the pilot is equivalent to filtering the seismic signal with a digital matched filter, where the impulse response of the matched filter is the pilot reversed in time and delayed so that it is causal. In the presence of additive white noise, this would be the optimum detection procedure (in an instantaneous signal-to-noise-ratio sense) for the case in which adjacent reflection events are separated in time by at least twice the duration of the pilot. However, because the reflection events are not restricted in their separation and because the matched filtering or correlation is performed digitally after sampling, the result is suboptimal.

Two difficulties arise when one attempts to resolve reflection events from correlated data. If the original reflection event can be represented by a discrete impulse, that event will be much broader in time after the correlation process. The impulse is replaced by the autocorrelation function of the pilot, the Klauder wavelet. Because of the bandwidth limitation imposed by the sweep limits, there is a loss of resolution in the process. This is also true in impulsive source exploration. The second problem concerns interactions between proximate reflection events. The correlation process will reproduce Klauder wavelets centered at each event. Oscillations in the tails of these wavelets will tend to obscure other reflection events. This problem is compounded by the tendency of reflection events to decay in magnitude with time. Due to the length of the pilot autocorrelation function, even reflection events occurring much later in time can be totally masked by correlation effects from earlier events. It is desirable then that an approach be developed which would improve resolution of the reflection events.

SUMMARY OF THE INVENTION

One objective of this invention is to provide methods for avoiding the limitations of the conventional correlation technique relative to the processing of Vibroseis ® data.

Another objective of this invention is to provide methods for improving the resolution of reflection events when Vibroseis ® data is processed.

An additional objective of this invention is to provide methods for processing Vibroseis ® data in order to avoid the limitations of the conventional correlation process and to improve the resolution of reflection events, which methods minimize computational requirements.

A further objective of this invention is to provide apparatus for implementing methods for processing Vibroseis ® data, which methods avoid the limitations of the conventional correlation process and improve the resolution of reflection events.

In accordance with this invention, methods and apparatus are provided for enhancing the resolution of reflection events present in Vibroseis ® data through a process of estimating the earth's impulse response. The methods of this invention are based on a system identification approach to the estimation of the impulse response of the earth from Vibroseis ® data. It is the retention of the pilot which serves as the basis for the system identification approach of this invention for estimating the arrival times of the reflection events. Referred to as Vibroseis ® system identification (VSI), the methods of this invention avoid the limitations in the conventional correlation of Vibroseis ® data and improve the resolution of reflection events.

The methods of this invention for estimating the impulse response of the earth from Vibroseis ® data are based on a time domain system identification approach, the earth's impulse reponse being estimated by operating on the seismic trace and the vibrator pilot. The preferred method of this invention is an adaptive VSI method using a sliding data window and the uncorrelated trace data. Preferably, the process used to control the adaptation is the fast Kalman estimation (FKE) technique. This technique, based on recursive least squares, has a fast convergence rate and desirable computational requirements. The preferred method of this invention implemented by means of the FKE technique is adaptive in nature, which is advantageous in processing inherently nonstationary seismic data. All operations are performed in the time domain using uncorrelated data. The alternative method of this invention is a non-adaptive VSI method. It uses the Levinson recursion technique to compute the Wiener filter solution based on the pilot autocorrelation function and the correlated trace data.

In accordance with the VSI approach of this invention, the sweep or pilot is input to a means having a first controllable response characteristic which estimates or approximates the actual impulse response characteristic of the earth to the same input sweep. The output of the earth response characteristic estimating means as well as the uncorrelated trace data are then input to a means for generating an error output. The error output is an indication of the correctness of the estimate of the actual earth response characteristic and is input to a means for controlling the response characteristic of the earth response characteristic estimating means. In the preferred embodiment, the response characteristic of the earth response characteristic estimating means is recursively controlled in accordance with the adaptive VSI method implemented by means of the FKE technique. In another embodiment, the response characteristic of the earth response characteristic estimating means is non-recursively controlled in accordance with the non-adaptive VSI method implemented by means of the Levinson recursion technique.

Simulations illustrate the operation of the adaptive and non-adaptive VSI methods of this invention in a noise free environment. This allows the convergence characteristics of the methods of this invention to be carefully studied. The results indicate that the methods of this invention for estimating the earth's impulse response from Vibroseis® data effectively avoid the need for going through a conventional correlation step and are useful in obtaining better resolution of reflection events.

BRIEF DESCRIPTION OF THE DRAWINGS

The above and other objectives and advantages of this invention and a better understanding of the principles and details of this invention will be evident to those skilled in the art in view of the following description of the preferred embodiments given in conjunction with the accompanying drawings, in which:

FIGS. 4A through 4C, shows test data generated using an untapered pilot. FIG. 4A illustrates a reflection sequence, h(k); FIG. 4B illustrates the pilot, y(k); and FIG. 4C illustrates the uncorrelated data, x(k).

FIGS. 5A through 5C, shows test data generated using a tapered pilot. FIG. 5A illustrates a reflection sequence, h(k); FIG. 5B illustrates the pilot, y(k); and FIG. 5C illustrates the uncorrelated data, x(k).

FIGS. 6A through 6C, shows correlated data. FIG. 6A illustrates $x_c(k)$ from untapered pilot data; FIG. 6B illustrates $x_c(k)$ from tapered pilot data; and FIG. 6C illustrates a reflection sequence, h(k).

FIGS. 7A through 7D, shows analysis of the untapered pilot data using the adaptive VSI method of this invention. FIG. 7A illustrates s(k), first pass; FIG. 7B illustrates e(k), first pass; FIG. 7C illustrates ŝ(k), second pass; and FIG. 7D illustrates e(k), second pass.

FIGS. 8A through 8D, shows analysis of the tapered pilot data using the adaptive VSI method of this invention. FIG. 8A illustrates ŝ(k), first pass; FIG. 8B illustrates e(k), first pass; FIG. 8C illustrates ŝ(k), second pass; and FIG. 8D illustrates e(k), second pass.

FIGS. 9A through 9C, shows comparison of the final w(k) from the adaptive VSI method of this invention with the number of coefficients (M) equal to 501 for various levels of prewhitening ($\delta$), using the untapered pilot data. In FIG. 9A, $\delta=1.0$; in FIG. 9B, $\delta=0.734$; and in FIG. 9C, $\delta=0.0734$.

FIGS. 10A through 10C, shows comparison of the final w(k) from the adaptive VSI method of this invention with the number of coefficients (M) equal to 501 for various levels of prewhitening ($\delta$), using the tapered pilot data. In FIG. 10A, $\delta=1.0$; in FIG. 10B, $\delta=0.734$; and in FIG. 10C, $\delta=0.0734$.

FIGS. 11A through 11C, shows comparison of ŵ(k) from the non-adaptive VSI method of this invention with the number of coefficients (M) equal to 501 for various levels of prewhitening ($\delta$), using the untapered pilot data. In FIG. 11A, $\delta=1.0$; in FIG. 11B, $\delta=0.734$; and in FIG. 11C, $\delta=0.0734$.

FIGS. 12A through 12C, shows comparison of ŵ(k) from the non-adaptive VSI method of this invention with the number of coefficients (M) equal to 501 for various levels of prewhitening ($\delta$), using the tapered pilot data. In FIG. 12A, $\delta=1.0$; in FIG. 12B, $\delta=0.734$; and in FIG. 12C, $\delta=0.0734$.

FIGS. 13A through 13C, shows uncorrelated data generated from a reflection sequence having an exponential decay in the amplitudes of the reflection events. FIG. 13A illustrates a reflection sequence, h(k); FIG. 13B illustrates the uncorrelated data, $x_u(k)$, generated using the untapered pilot; and FIG. 13C illustrates the uncorrelated data, $x_t(k)$, generated using the tapered pilot.

FIGS. 14A through FIG. 14D, shows analysis results for the untapered pilot data with the number of coefficients (M) equal to 501 and the prewhitening level ($\delta$) equal to 1.0. FIG. 14A illustrates the correlated trace data, $x_c(k)$; FIG. 14B illustrates the final adaptive VSI method solution, w(k); FIG. 14C illustrates the final non-adaptive VSI method solution, ŵ(k); and FIG. 14D illustrates a reflection sequence, h(k).

FIGS. 15A through 15D, shows automatic gain control (AGC) for the corresponding plots in FIG. 14, where the AGC window width is 75 samples.

FIGS. 16A through 16D, shows analysis results for the tapered pilot data with the number of coefficients (M) equal to 501 and the prewhitening level ($\delta$) equal to 1.0. FIG. 16A illustrates the correlated trace data, $x_c(k)$; FIG. 16B illustrates the final adaptive VSI method solution, w(k); FIG. 16C illustrates the final non-adaptive VSI method solution, ŵ(k); and FIG. 16D illustrates a reflection sequence, h(k).

Figure 16:
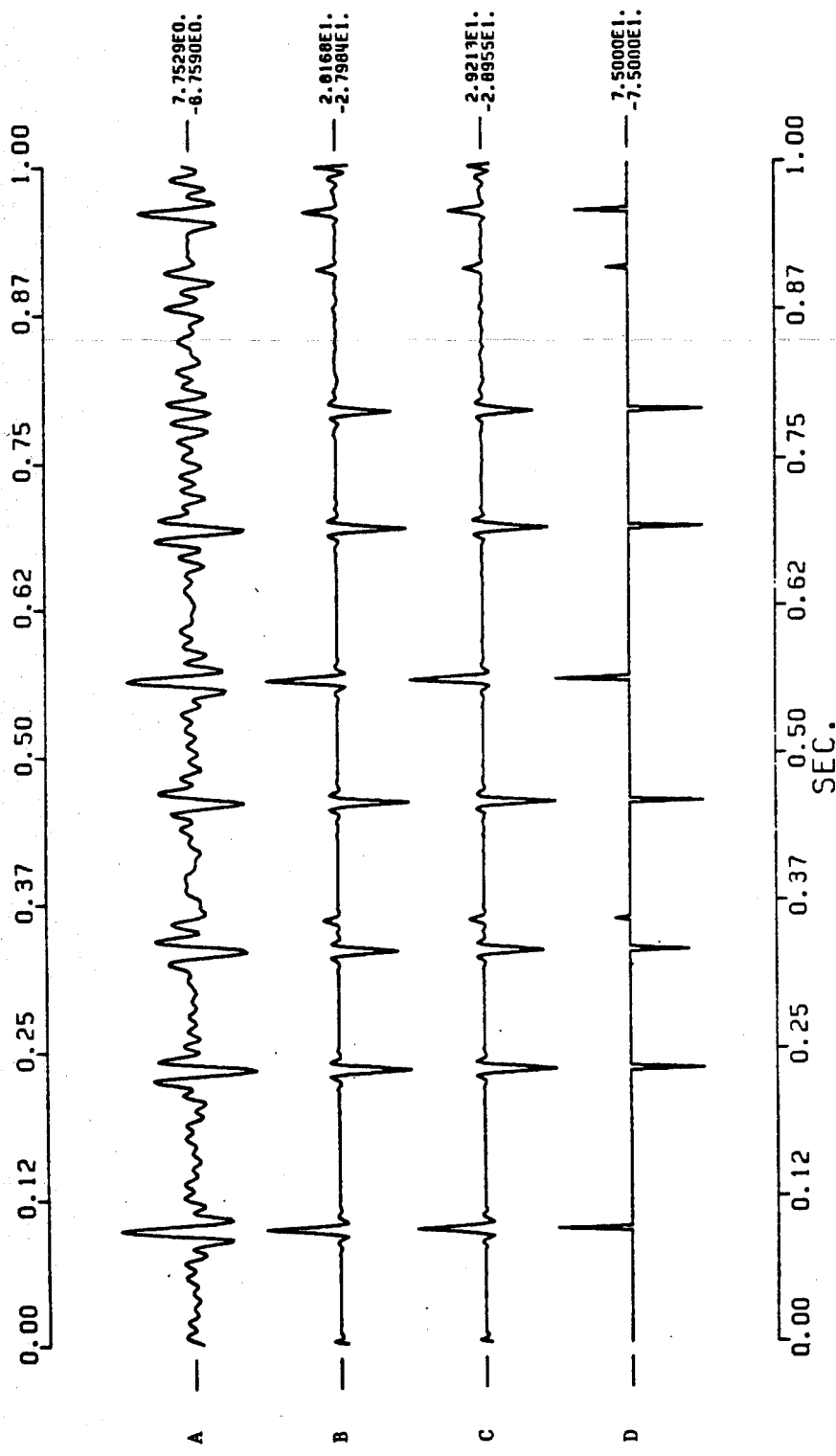
FIG. 16, comprising
Figure 17:
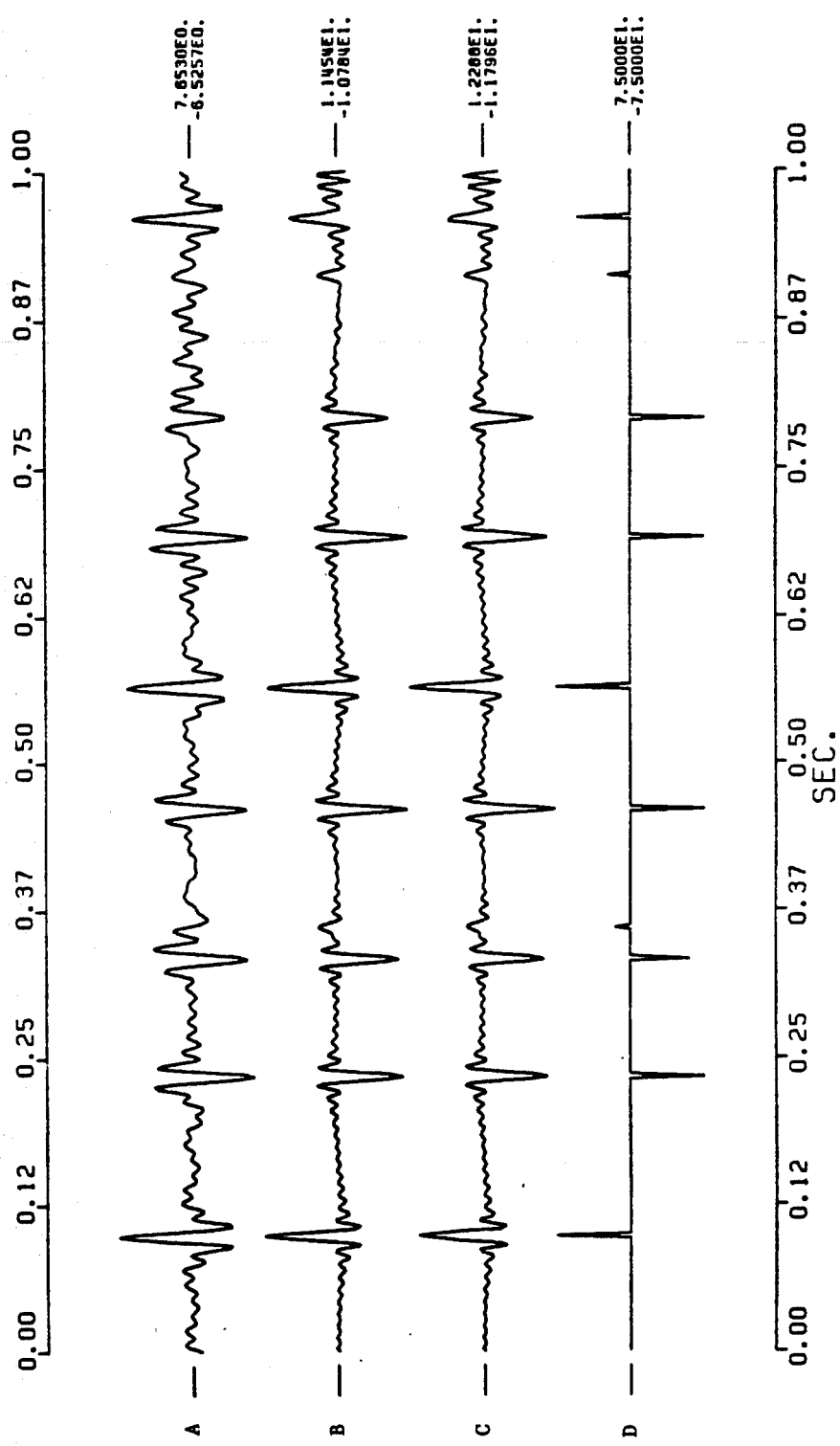

And,

FIG. 17, comprising FIGS. 17A through 17D, shows AGC for the corresponding plots in FIG. 16, where the AGC window width is 75 samples.

DESCRIPTION OF THE PREFERRED EMBODIMENTS

Figure 1:
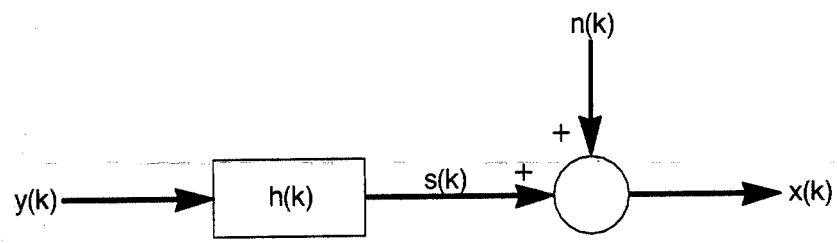
FIG. 1 shows a Vibroseis® data production model.

The model used for Vibroseis ® data production is shown in FIG. 1. The input sweep or pilot is y(k). It is assumed that the earth's response to the sweep will be linear. The characteristics of the earth can thus be represented by an impulse response h(k), which will contain a sparse collection of discrete impulses (These impulses will occur at random times with random amplitudes.). h(k) is short for h(kT), where T is the sampling interval, and k is sample or time k. The uncorrelated trace data is x(k), obtained by summing the unobservable earth response s(k) and additive noise n(k). The system identification problem solved by this invention is: given recordings of x(k) and y(k), estimate the unknown system h(k).

Figure 2:
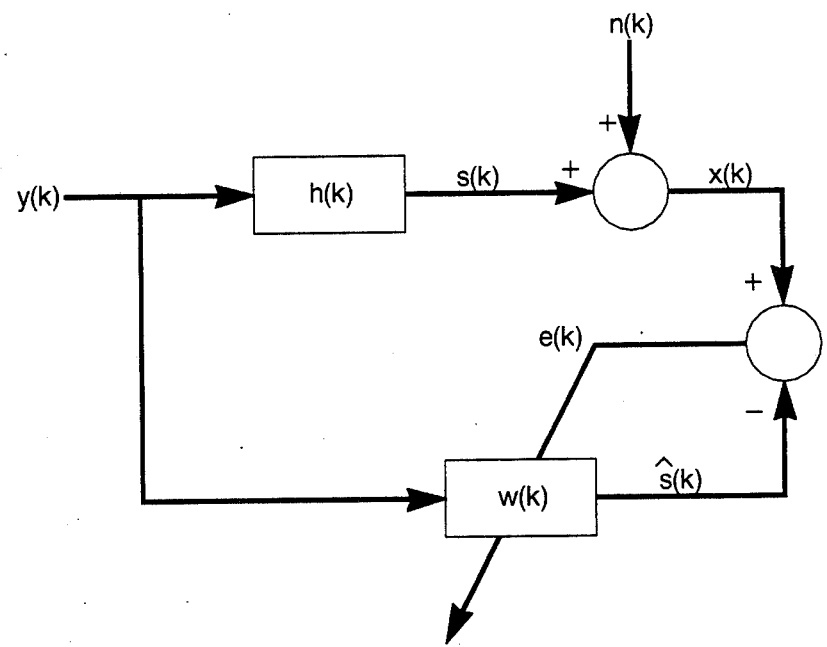
FIG. 2 shows a Vibroseis® system identification (VSI) model in accordance with this invention.

The analysis model used for the Vibroseis ® system identification (VSI) approach in accordance with this invention is shown in FIG. 2. The upper portion of the VSI model shown in FIG. 2 repeats the data production mechanism shown in FIG. 1. As shown in the lower portion of FIG. 2, in accordance with this invention, the sweep y(k) is additionally used as the input to a linear filter w(k) which serves as a model for h(k), the physical system to be identified. If w(k) is a good estimate of h(k), the output ŝ(k) of w(k) will in some sense be a good estimate of s(k). The measure of the correctness of the estimate ŝ(k) is determined from the error term e(k). The error e(k) actually contains two components:

(1) that due to errors in modeling h(k) by w(k) and
(2) deleterious effects due to the presence of the additive noise component n(k).

If n(k)=0 for all k, this will force e(k) to reflect only modeling errors. In accordance with the adaptive method of this invention, e(k) is used to generate a new estimate w(k) for each sample step. The criterion used to establish how well ŝ(k) estimates s(k) will be the minimization of the sum of the squares of the error sequence e(1), e(2), . . . , e(k). The characteristics of w(k) for the case of the adaptive VSI method of this invention will now be described.

Because of the physical nature of h(k), w(k) has the characteristics of a causal transversal filter. That is, it can be represented in the Z-domain by the polynomial $$W(z) = \sum_{k=0}^{M-1} w(k) z^k. \tag{1}$$

W(z) is a finite impulse response (FIR) filter. The value of M will determine in part the accuracy of the estimate for h(k). If $N_L$ is the number of samples in the listening interval of the recording time, M can be constrained in equation (1) so that $M \geq N_L$. A reasonable upper bound on M is $M \leq N_R$, where $N_R$ is the number of samples in the recording interval. The output of the model w(k) at time k is then given by $$\hat{s}(k) = \sum_{i=0}^{M-1} w(i) y(k-i). \tag{2}$$

Let the error at time k be defined as $$e(k) = u(k) - \underline{w}^T \underline{y}(k), \tag{3}$$

where $\underline{w} = [w(0) \ldots w(M-1)]^T$, $\underline{y}(k) = [y(k-1) \ldots y(k-M)]^T$, and u(k) is the desired signal. Because of the definition for y(k), e(k) actually represents a prediction error. The desired signal u(k) is replaced by s(k) if the data are recorded perfectly. If additive noise is present, u(k) must be replaced by x(k), since s(k) is unobservable. In either case, u(k) is uncorrelated data.

The error criterion to be satisfied at time n is the minimization of the loss function $$L(\underline{w}) = \sum_{k=1}^{n} e^2(k) \tag{4a}$$

$$= \sum_{k=1}^{n} [u(k) - \underline{w}^T \underline{y}(k)]^2. \tag{4b}$$

The optimization of equation (4b) for each n=0, 1, . . . , $N_R$ requires the solution of the matrix equation $$\underline{R}_{yy}(n)\underline{w}^*(n) = \underline{r}_{yu}(n), \tag{5}$$

where $\underline{w}^*$ is now indexed with n to indicate the adaptive nature of the solution. $\underline{R}_{yy}(n)$ is the M×M matrix $$\underline{R}_{yy}(n) = \sum_{k=1}^{n} \underline{y}(k) \underline{y}^T(k) \tag{6a}$$

and $\underline{r}_{yu}(n)$ is the M×1 vector $$\underline{r}_{yu}(n) = \sum_{k=1}^{n} \underline{y}(k) u(k). \tag{6b}$$

Indexing $\underline{w}^*$ with n in equation (5) indicates that equation (5) is solved for $\underline{w}^*$ for n=1, . . . , $N_R$. If equation (5) is solved only for $n=N_R$, the method will be non-adaptive as will be described later in more detail. Assuming that the adaptive VSI of this invention is used, equation (5) can be solved directly for each value of n. This would require $N_R$ solutions to an M×M matrix equation. If the listening period is three seconds and the sampling rate is 500 Hz, then the direct use of equation (5) would require solving a system of 1500 simultaneous equations for each value of n from 1 to $N_R$. If the recording time in this example is nine seconds, equation (5) would be solved 4500 times. It is essential that this computational burden be reduced for the adaptive approach to be of practical value.

One approach for solving equation (5) adaptively is the least mean squares (LMS) gradient technique and its variations. This type of technique is based on B. Widrow et al., "Adaptive Noise Cancelling: Principles and Applications", *Proceedings of the I. E. E. E.*, v. 63, pp. 1692-1716, 1975, and has the advantage of a low computation rate. Where general matrix equation solution routines require computations proportional to $M^3$, this technique's computation rate is proportional to $M^2$. However, convergence of the adaptive LMS technique to the optimal solution $\underline{w}^*$ can be excessively slow if the eigenvalues of the matrix $\underline{R}_{yy}(k)$ have a broad range of values.

Another adaptive equalization method also has a computation rate proportional to $M^2$, although it requires some additional initial condition restrictions. Called the fast Kalman estimation (FKE) method (See D. D. Falconer and L. Ljung, "Application of Fast Kalman Estimation to Adaptive Equalization", *I. E. E. E. Trans. on Communications*, v. COM-26, pp. 1439-1446, 1978.), this technique depends on the data shifting property that is implied in moving from step k to k+1 in equation (3). Making that transition enters one new data point, y(k+1), and deletes the oldest data point, y(k−M), from the input data vector $\underline{y}$. The FKE technique is based on recursive least squares (RLS) estimation. The FKE technique, which will now be described, forms the basis for implementation of the adaptive VSI method of this invention having a minimal computational burden.

The minimization of the error criterion L($\underline{w}$) in equation (4) requires the solution of equation (5) for every value of n if an adaptive solution is desired. Because of the construction of $\underline{R}_{yy}(n)$ and $\underline{r}_{yu}(n)$, equation (5) can be written in the recursive form $$\underline{w}(n) = \underline{w}(n-1) + \underline{c}(n)e(n), \qquad (7)$$

where the "*" has been dropped from $\underline{w}(n)$. The M×1 vector $\underline{c}(n)$ is defined as the solution to the matrix equation $$\underline{R}_{yy}(n-1)\underline{c}(n) = \underline{y}(n). \qquad (8)$$

The error term e(n) in equation (7) would require $\underline{w}(n)$ if computed using equation (3). But since $\underline{w}(n)$ is not available, e(n) is approximated by $$e(n) \approx u(n) - \underline{w}^T(n-1)\underline{y}(n). \qquad (9)$$

Given the solution $\underline{c}(n)$ from equation (8), $\underline{w}(n)$ can be generated from $\underline{w}(n-1)$ using equations (7) and (9). However, the solution of equation (8) requires the solution of an M×M system of equations. Alternatively, $\underline{c}(n)$ can also be generated recursively if the following approximation is used in place of equation (8):

$$\underline{R}_{yy}(n)\underline{c}(n) = \underline{y}(n). \qquad (10)$$

With these approximations established, the FKE technique by means of which the adaptive VSI method of this invention is implemented can be summarized as follows:

Set initial conditions:
1. $\underline{a}(0) = \underline{d}(0) = \underline{y}(1) = \underline{c}(1) = \underline{w}(1) = \underline{0}_M$,
where $\underline{0}_M$ is the M×1 column vector with all elements equal to zero.
2. $\sigma(0) = \delta > 0$,
where δ is a prewhitening parameter applied for eliminating the singularities associated with matrix inversion and thereby stabilizing the FKE-implemented solution of the matrix equation.

Given $\underline{y}(n)$, y(n), and u(n+1), for n=1 to $N_R$, where y(n) is the pilot and u(n+1) is the uncorrelated trace, compute 1. $\epsilon_1(n) = y(n) + a^T(n-1)\underline{y}(n)$ 2. $a(n) = a(n-1) - c(n)\epsilon_1(n)$ 3. $\epsilon_2(n) = y(n) + a^T(n)\underline{y}(n)$ 4. $\sigma(n) = \sigma(n-1) + \epsilon_1(n)\epsilon_2(n)$ 5. Form the (M+1)×1 vector $\underline{c}'(n)$ partitioned as $$\underline{c}'(n) = \left[ \begin{array}{c} \sigma^{-1}(n)\epsilon_2(n) \\ \hline \underline{c}(n) + \sigma^{-1}(n)\epsilon_2(n)\underline{a}(n) \end{array} \right] \begin{array}{c} 1 \times 1 \\ M \times 1 \end{array}$$

6. Repartition $\underline{c}'(n)$ as $$\underline{c}'(n) = \left[ \begin{array}{c} \underline{\gamma}(n) \\ \mu(n) \end{array} \right] \begin{array}{c} M \times 1 \\ 1 \times 1 \end{array}$$

7. $\epsilon_3(n) = d^T(n-1)\underline{y}(n+1) + y(n-M)$

8. $\underline{d}(n) = [\underline{d}(n-1) - \underline{\gamma}(n)\epsilon_3(n)][1 - \mu(n)\epsilon_3(n)]^{-1}$ 9. $\underline{c}(n+1) = \underline{\gamma}(n) - \mu(n)\underline{d}(n)$ 10. Compute the transversal filter output $$\hat{s}(n) = \underline{w}^T(n)\underline{y}(n+1)$$

11. $e(n+1) = u(n+1) - \hat{s}(n)$

12. $\underline{w}(n+1) = \underline{w}(n) + \underline{c}(n+1)e(n+1)$, where $\underline{w}(n)$ is the recursive estimate of h(k).

13. Repeat from step 1 if n < $N_R$; terminate otherwise.

Note that $\underline{y}(n+1)$ in step 10 is formed from $\underline{y}(n)$ and y(n):

$$\underline{y}(n) \left\{ \begin{pmatrix} y(n) \\ y(n-1) \\ \cdot \\ \cdot \\ \cdot \\ y(n-M+1) \\ y(n-M) \end{pmatrix} \right\} \underline{y}(n+1).$$

The data vectors $\underline{y}(n)$ and $\underline{y}(n+1)$ contain the shifting property necessary for the FKE technique.

At the termination of the process, the vector $\underline{w}$ will contain the last update as determined in step 12. It is also informative to retain the scalars $\hat{s}(n)$ and e(n) for all values of n. The resulting sequences are useful in determining the convergence characteristics.

The adaptive VSI method of this invention implemented by means of the FKE technique can be programmed into and executed by a general purpose digital computer, such as an IBM 370/168, using single precision computations. The programming of the adaptive VSI method derived above is a straightforward exercise of the skills possessed by one versed in the computer art and therefore need not be presented here.

The adaptive VSI method of this invention as implemented with the FKE technique will be demonstrated later. First, however, the characteristics of w(k) for the case of the non-adaptive VSI method of this invention will now be described.

In the section describing the system identification model, optimization of the error criterion L($\underline{w}$) resulted in $$\underline{R}_{yy}(n)\underline{w}^*(n) = \underline{r}_{yn}(n) \qquad (5)$$

as the equation defining the optimal estimate of the unknown system in the least squares sense. The adaptive VSI method of this invention would solve equation (5) for $\underline{w}^*(n)$ at each value of n.

The non-adaptive VSI method of this invention involves computing $\underline{w}^*(n)$ only for n=$N_R$. The M×M matrix $\underline{R}_{yy}(n)$ in equation (5) is in general not Toeplitz for any value of n. If it were Toeplitz, Levinson's recursive technique could be used to efficiently solve this system of equations. See N. Levinson, "The Wiener RMS (Root-Mean-Square) Error Criterion in Filter Design and Prediction", *J. Math. Phys.*, v. 25, pp. 261-278, 1947, and E. A. Robinson, *Multichannel Time Series Analysis With Digital Computer Programs*, San Francisco, Holden-Day, 1967.

Examining the contents of $\underline{R}_{yy}(n)$ in detail, the element $R_{ij}(n)$ in the ith row and jth column is $$R_{ij}(n) = \sum_{k=1}^{n} y(k-i)y(k-j) \tag{11}$$

for $i,j = 1, \ldots, M$. A determination is made of how different $R_{i+1,j+1}(n)$ is from $R_{ij}(n)$, the preceding element in the diagonal. From equation (11), $R_{i+1,j+1}(n)$ is given by $$R_{i+1,j+1}(n) = \sum_{k=1}^{n} y(k-i-1)y(k-j-1) \tag{12}$$

$$= \sum_{l=0}^{n-1} y(l-i)y(l-j)$$

$$= R_{ij}(n) + y(-i)y(-j) - y(n-i)y(n-j).$$

Since $y(k) = 0$ for $k < 0$, i.e., the vibrator sweep is assumed to be zero prior to time zero, $y(-i) = y(-j) = 0$. These adjacent elements on a diagonal thus differ only by $y(n-i)y(n-j)$. For large n, that difference tends to be negligible, and $\underline{R}_{yy}(n)$ can be approximated by a Toeplitz matrix in which the elements depend only on $|i-j|$. Assuming now that $n = N_R$ in equation (11), $$R_{ij}(N_R) = \sum_{k=1}^{N_R} y(k-i)y(k-j) \tag{13}$$

$$= \sum_{l=1-i}^{N_R-i} y(l)y(l+i-j).$$

The lower limit on the sum can be made zero since $y(k) = 0$, $k < 0$. If $y(k) = 0$, $k > N_R$, then the upper limit becomes $N_R - i + j$ and $R_{ij}(N_R)$ is approximated by $$\tilde{R}_{ij}(N_R) = \sum_{l=0}^{N_R-i+j} y(l)y(l+i-j) \overset{\Delta}{=} R_{yy}(i-j). \tag{14}$$

The elements of $\tilde{\underline{R}}_{yy}(N_R)$ are the autocorrelation values of the sequence $y(k)$.

The matrix $\tilde{\underline{R}}_{yy}(N_R)$ formed from equation (14) is Toeplitz, its elements a function only of the difference between i and j. This matrix is also symmetric, with $\tilde{R}_{ji}(N_R)$, the transpose element of $\tilde{R}_{ij}(N_R)$, given by $$\tilde{R}_{ji}(N_R) = \sum_{l=0}^{N_R-j+i} y(l)y(l+j-i) \tag{15}$$

$$= \sum_{k=j-i}^{N_R} y(k+i-j)y(k)$$

$$= \sum_{k=0}^{N_R-i+j} y(k)y(k+i-j)$$

$$= \tilde{R}_{ij}(N_R).$$

Using the same approach, the ith element of the vector $\underline{r}_{yu}(n)$ is $$r_i(n) = \sum_{k=1}^{n} y(k-i)u(k)$$

$$= \sum_{l=1-i}^{n-i} y(l)u(l+i).$$

Since $y(k) = 0$, $k < 0$, the lower limit becomes zero. If $n = N_R$, $$r_i(N_R) = \sum_{l=0}^{N_R-i} y(l)u(l+i), \tag{16}$$

the cross-correlation of the sequences $y(k)$ and $u(k)$. The vector formed from these elements is $\tilde{\underline{r}}_{yu}(N_R)$. The form of $\tilde{\underline{R}}_{yy}(N_R)$ and $\tilde{\underline{r}}_{yu}(N_R)$ suggests using the Levinson recursion technique to solve $$\tilde{\underline{R}}_{yy}(N_R)\overline{w} = \tilde{\underline{r}}_{yu}(N_R). \tag{17}$$

The vector $\overline{w}$ is the solution of the non-adaptive VSI method of this invention. In the terminology of Wiener filtering, equation (17) defines the Wiener filter $\overline{w}$ which attempts to produce as its output the desired signal $u(k)$ from its input $y(k)$. By definition, the desired signal $u(k)$ is $x(k)$, the uncorrelated data (or $s(k)$ if there is no additive noise).

The successful solution of equation (17) for $\overline{w}$ requires that the $M \times M$ matrix $\tilde{\underline{R}}_{yy}(N_R)$ be nonsingular. Even in cases where the matrix is nonsingular, and hence theoretically invertible, it may be ill-conditioned. Solutions for $\overline{w}$ obtained in such cases are of questionable value. Small changes in the vector $\tilde{\underline{r}}_{yu}(N_R)$ in equation (17) can produce large changes in $\overline{w}$ when the matrix RHD $yy(N_R)$ is ill-conditioned. The validity of solutions obtained from ill-conditioned systems depends strongly on the technique used to solve the matrix equation and the precision of the computations.

The effects of ill-conditioning on the solution of equation (17) can be reduced by prewhitening described earlier in connection with the adaptive VSI method of this invention, a prewhitening parameter being applied for eliminating the singularities and thereby stabilizing the Levinson-recursion-implemented solution of the matrix equation. Consequently, equation (17) is replaced by $$[\tilde{\underline{R}}_{yy}(N_R) + \delta \underline{I}_M]\overline{w} = \tilde{\underline{r}}_{yu}(N_R), \tag{18}$$

where the elements of $\tilde{\underline{R}}_{yy}(N_R)$ are the autocorrelation values of the sequence $y(k)$, $\tilde{\underline{r}}_{yu}(N_R)$ is a vector with elements equal to the cross-correlation values between the sweep $y(k)$ and the desired signal $u(k) = x(k)$ (or $u(k) = s(k)$ if there is no additive noise), the positive scalar $\delta$ is the prewhitening factor, and $\underline{I}_M$ is the $M \times M$ identity matrix. Equation (18) defines the Levinson recursion technique by means of which the non-adaptive VSI method of this invention is implemented.

The effect of equation (18) is to add $\delta$ to each element on the major diagonal of $\tilde{\underline{R}}_{yy}(N_R)$. The value of $\delta$ should be kept as small as possible to avoid changing $\overline{w}$ excessively.

The non-adaptive VSI method of this invention implemented by means of the Levinson recursion technique can be programmed into and executed by a general purpose digital computer, such as an IBM 370/168, using single precision computations. The programming of the non-adaptive VSI method derived above is a straightforward exercise of the skills possessed by one versed in the computer art and therefore need not be presented here.

The input to the VSI model of this invention is the recorded vibrator sweep y(k) as shown in FIG. 2. For the simulations, the sweep is generated by evaluating $$y(t) = A \sin\left[2\pi\left(f_1 t + \frac{f_2 - f_1}{2\tau} t^2\right)\right] \quad (19)$$

at discrete instances of time $t=kT$, $k=0, \ldots, N_p$, where T is the sampling interval. Taking the derivative of the argument of the sine function and dividing by $2\pi$ gives the instantaneous frequency of the sweep:

$$f_i(t) = f_1 + \frac{f_2 - f_1}{\tau} t. \quad (20)$$

At $t=0$, the instantaneous frequency is $f_1$. When $t=\tau=N_p T$, where $\tau$ is the sweep duration parameter, the instantaneous frequency is $f_2$. $f_i(t)$ is linearly swept between $f_1$ and $f_2$. If $f_2 > f_1$, $f_i(t)$ increases with time and an upsweep results. A downsweep is generated when $f_2 < f_1$.

For the simulations presented here, the following parameter values were used: $A=1$, $f_1=20$ Hz, $f_2=80$ Hz, $\tau=3$ sec, and $T=2$ msec for simulating Vibroseis ® operation. With these parameters, there are 1501 samples in the pilot, y(k), $k=0, \ldots, N_p=1500$. The recording interval used for the simulations was 4 sec, i.e., x(k) is generated for $k=0, \ldots, N_R=2000$. This gives 501 points in the listening interval, $k=0, \ldots, N_L \triangleq N_R - N_p$.

The VSI system of this invention shown in FIG. 2 was also tested with tapered or windowed pilots as inputs. In the case of tapering, equation (19) becomes $$y(t) = p(t) \cdot A \sin\left[2\pi\left(f_1 t = \frac{f_2 - f_1}{2\tau} t^2\right)\right]. \quad (21)$$

Figure 3:
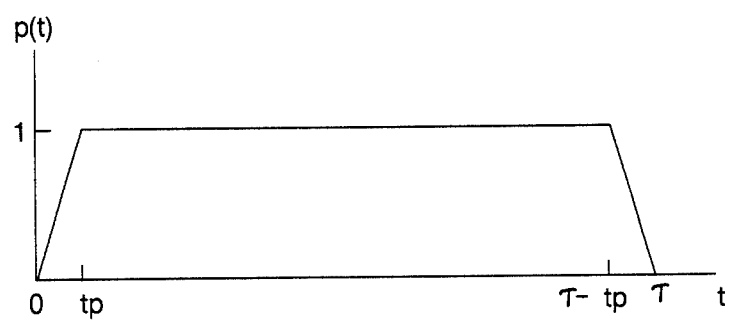
FIG. 3 shows a multiplicative window employed to linearly taper the Vibroseis® pilot in some of the simulations which illustrate the use of the methods of this invention.

In the simulations shown here, p(t) applies a linear taper to the ends of the sweep. p(t) is plotted in FIG. 3 with $t_p$ indicating the tapering width. The effects of p(t) will be noted later.

Figure 4:
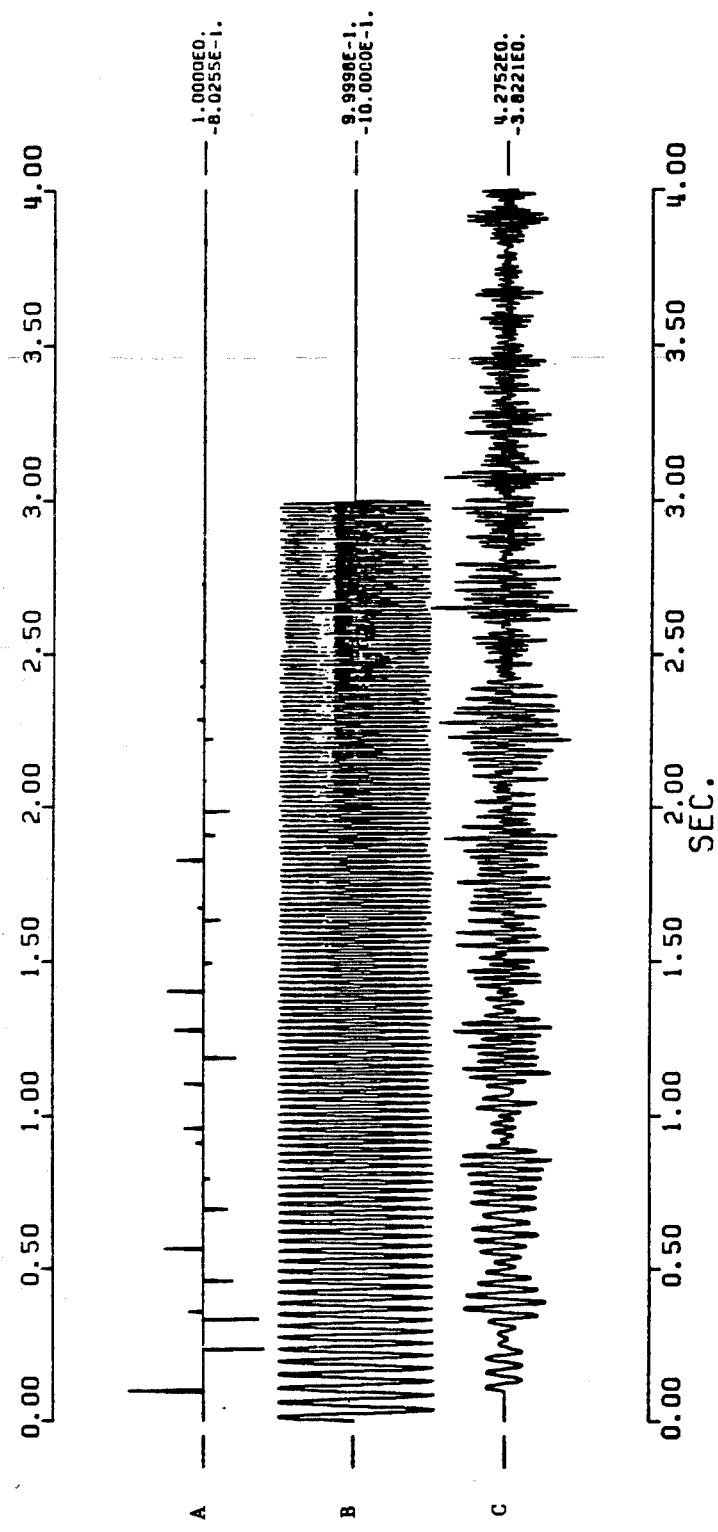
FIG. 4, comprising
Figure 5:
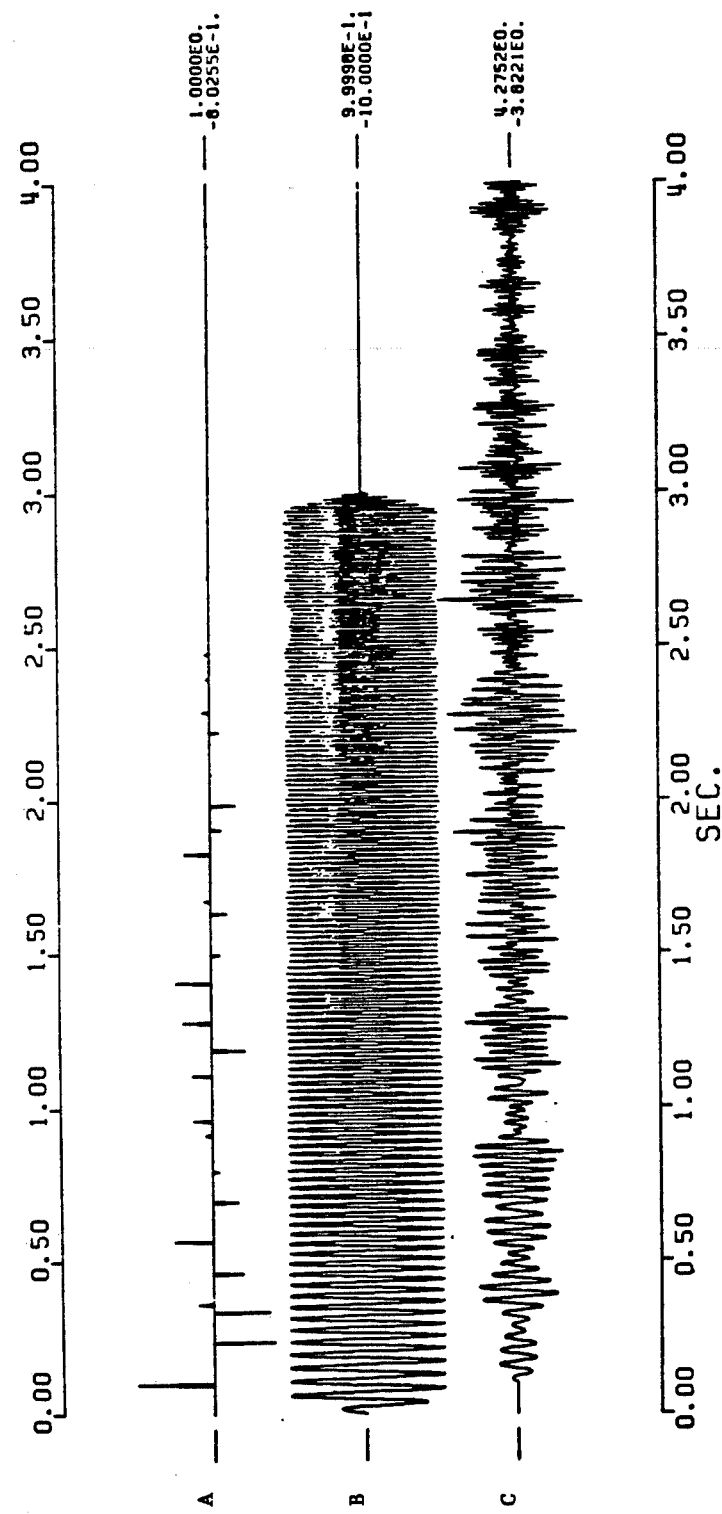
FIG. 5, comprising

FIGS. 4 and 5 show the data used in the first set of tests. Plot A of FIG. 4 is the reflection sequence h(k) used to represent the impulse response of the layered earth. It has randomly occurring impulses during the first three seconds, followed by one second of zeros. The magnitudes of the impulses taper off linearly from 0 to 3 sec, with the initial impulse scaled to a value of 1.0. Plot B of FIG. 4 illustrates the untapered sweep which produces plot C when convolved with the reflection sequence h(k) in FIG. 4A. FIG. 5 is identical to FIG. 4, except that the sweep has been tapered on each end. The tapering width $t_p$ is 0.05 sec. Plot C of FIGS. 4 and 5 represents the uncorrelated trace data x(k) to be analyzed in the VSI model of this invention as the output of the unknown earth. The sweep y(k) in plot B of these figures is the recorded pilot used as the input to the VSI model. It is assumed that all data are recorded without error.

Since the listening interval is one second and $N_L=500$, the number of taps M in the adaptive transversal filter is taken to be 501. Thus, w(k) will estimate the initial second of h(k). The FKE technique of the adaptive VSI method of this invention is initially called with the input data vector $\underline{y}(1)=[y(0)\ y(-1)\ \ldots\ y(-500)]^T$ and new data point y(1). Because of the model, y(k)=0 for k<0 and $\underline{y}(1)=[0\ 0\ \ldots\ 0]^T$ if y(0)=0, meeting the input vector initial condition requirement for the FKE technique. The parameter $\delta$ used in the FKE technique as a prewhitening factor is varied in the tests, demonstrating its effects on stability.

Figure 6:
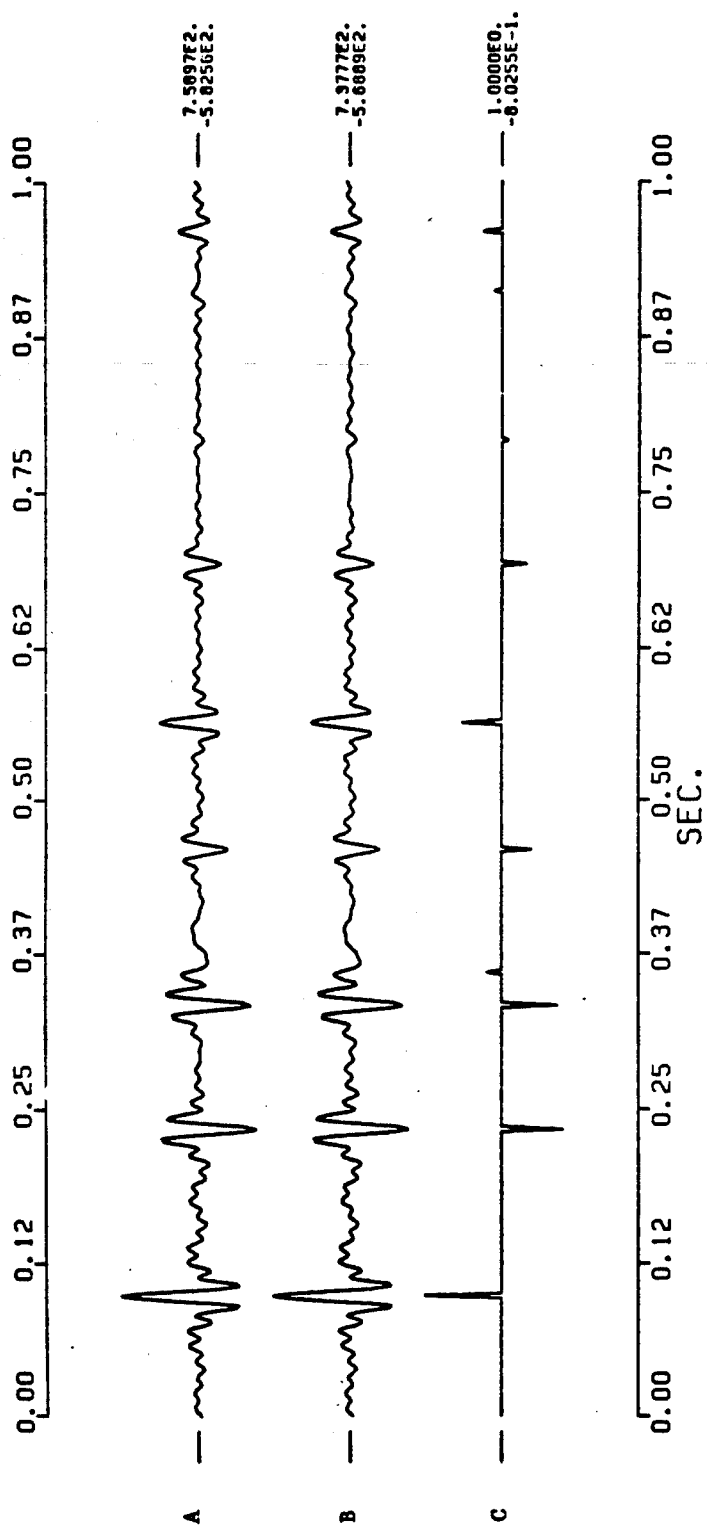
FIG. 6, comprising

Processing the data from FIGS. 4 and 5 using the conventional correlation technique results in the first two plots in FIG. 6. Plot A is from the data generated with the untapered sweep in FIG. 4. Using the data from the tapered sweep in FIG. 5 gives plot B. The initial second of data h(k) is plotted in FIG. 6C for comparison. There are slight differences between the two curves, primarily in the maximum and minimum amplitudes reached in the plot (indicated to the right of each plot). The repetition of the Klauder wavelet at the location of each reflection event is evident, as is the resulting loss of resolution. Interference between nearby events is also illustrated, especially for the two events occurring at about 0.3 sec.

Figure 7:
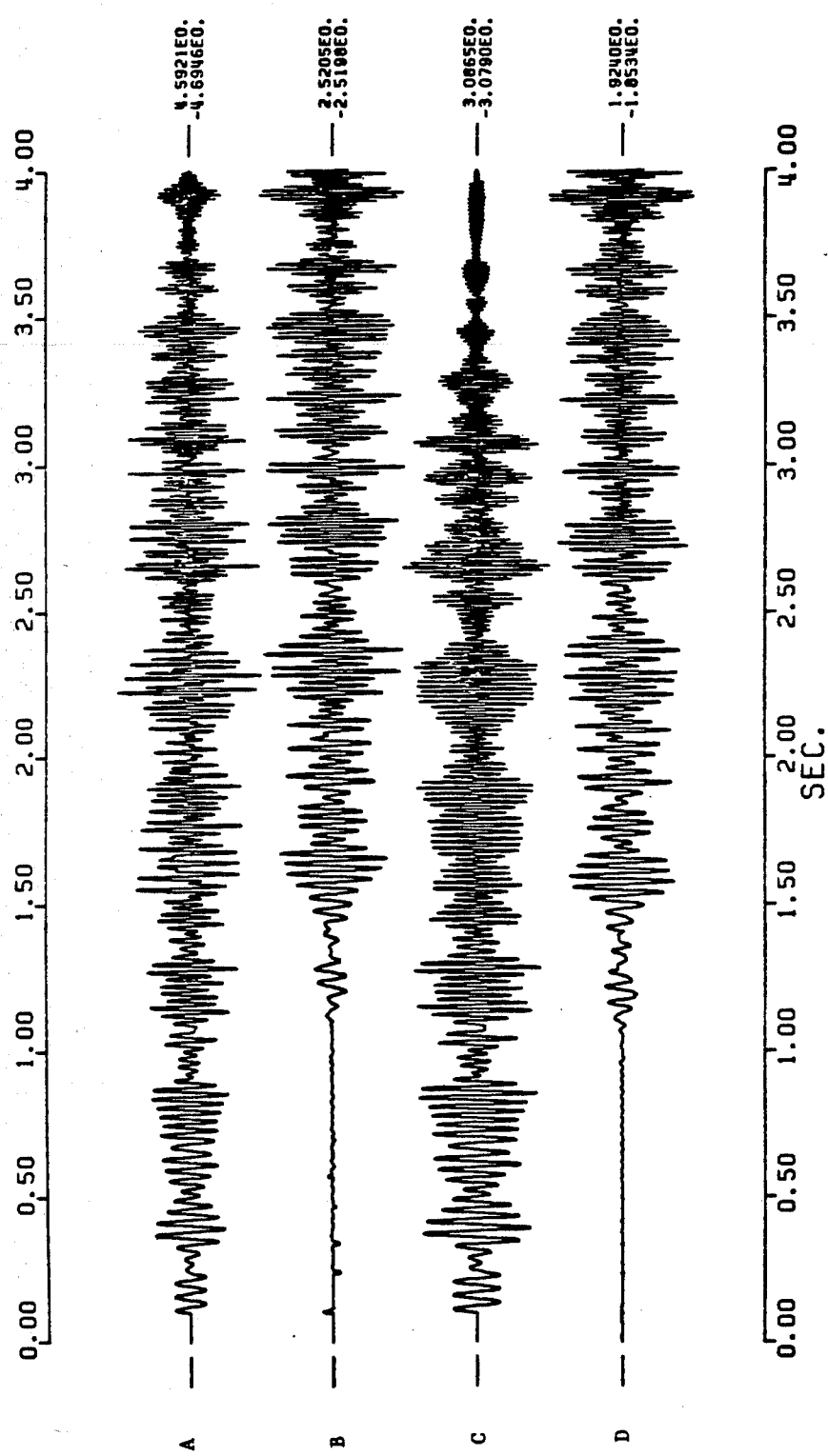
FIG. 7, comprising

The results of applying the adaptive VSI method of this invention to the data of FIGS. 4 and 5 are presented in FIGS. 7 through 10. The FKE technique of the adaptive method of this invention was initiated with a prewhitening factor of $\delta=1.0$ for the data in FIG. 7. The sequences ŝ(k) and e(k) generated by the adaptive VSI method in the analysis of the data in FIG. 4 are shown in FIG. 7. Plot A of FIG. 7 is ŝ(k), the estimate of the earth's response to the pilot y(k). In FIG. 7B is e(k), the error signal generated by the FKE technique. Note that it has a low level for the initial second of data. Spikes in that interval correspond to locations of reflection events in h(k). Each of the spikes in e(k) represents that portion of x(k) due to a reflection event that is not present in ŝ(k) because w(k) has not yet "learned" of the existence of that event. The adaptation of w(k) is evident in the decay of the error spike toward zero as time increases. In the later three seconds of data, e(k) has significant levels. The adaptive VSI method of this invention does not have the ability to learn about reflection events in h(k) which occur after t=1 sec because w(k) has been limited to 501 coefficients. Allowing a greater number of coefficients in w(k) would reduce the level of e(k) at progressively later times.

Since there is no additive noise in these tests and x(k)=s(k), the output signal-to-noise ratio (SNR) can be computed. Taking s(k) as the output, e(k) represents the noise introduced by the adaptive VSI method of this invention. Defining the output SNR in decibels (dB) as $$SNR_o = 10 \log_{10} \frac{\sum_{k=0}^{N_R} s^2(k)}{\sum_{k=0}^{N_R} e^2(k)}, \quad (22)$$

$SNR_o=3.73$ dB after the adaptive VSI method of this invention completes one pass through the data. Ideally, at the end of this pass w(k) would have learned about all reflection events in the first second of h(k). If the pilot is convolved with this final w(k), the resulting output should have less error in the initial second of data. Plot C of FIG. 7 shows the output ŝ(k) from this operation. Subtracting ŝ(k) from x(k) gives the residual error e(k)

in plot D of FIG. 7. The output SNR associated with the second pass in FIGS. 7C and 7D is 6.51 dB, so reprocessing the data with the final w(k) results in almost 3 dB SNR improvement. The SNR values for this test are summarized in the first row of Table I.

TABLE I

Summary of Adaptive VSI Method Tests

| Pilot | δ | SNR$_o$, dB Pass 1 | SNR$_o$, dB Pass 2 |
|---|---|---|---|
| Untapered | 1.0 | 3.73 | 6.51 |
| Untapered | 0.734 | 3.56 | 6.50 |
| Untapered | 0.0734 | 1.36 | −6.71 |
| Tapered | 1.0 | 3.99 | 6.45 |
| Tapered | 0.734 | 3.88 | 6.43 |
| Tapered | 0.0734 | −7.54 | −30.87 |

Figure 8:
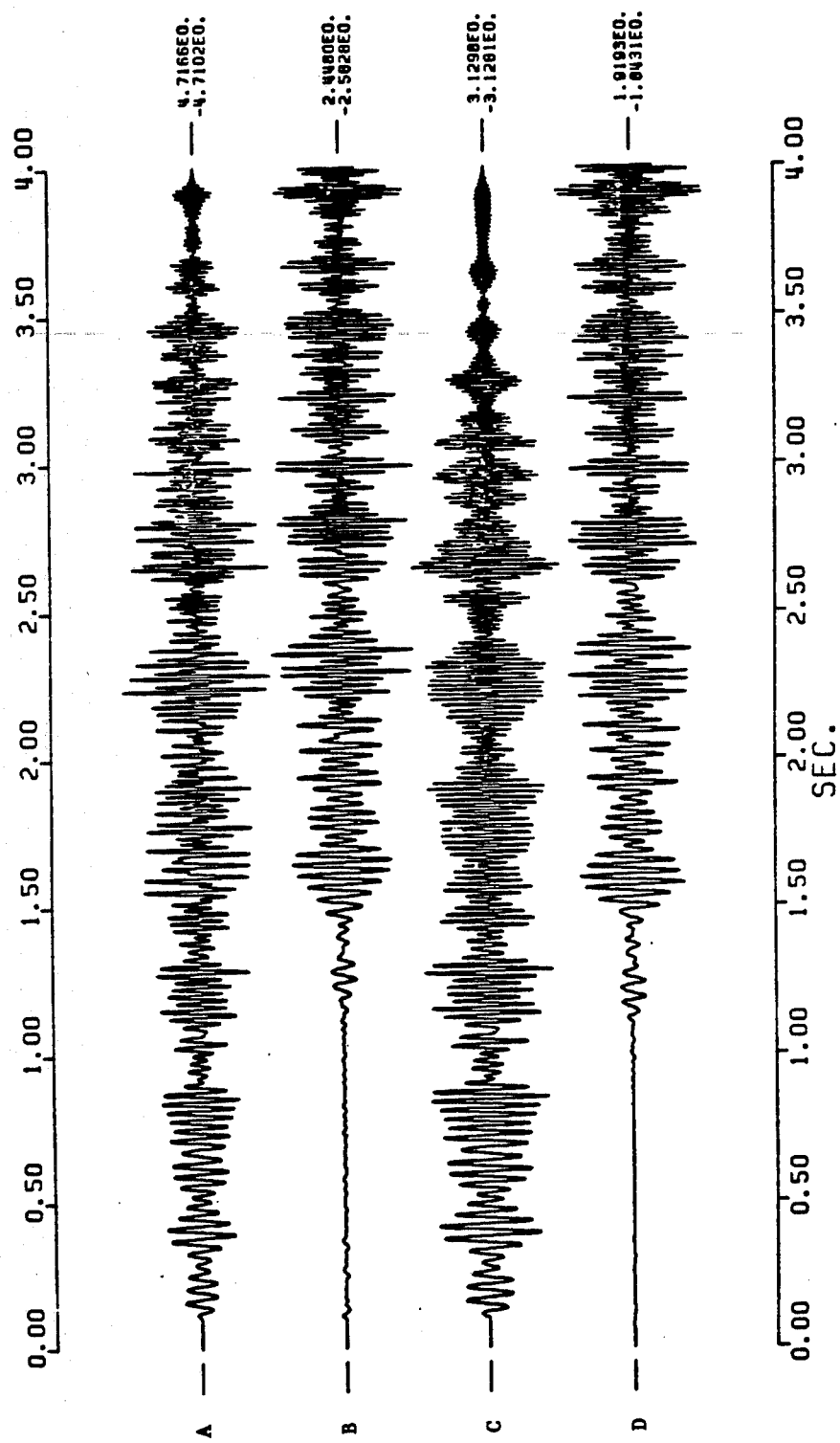
FIG. 8, comprising
Figure 9:
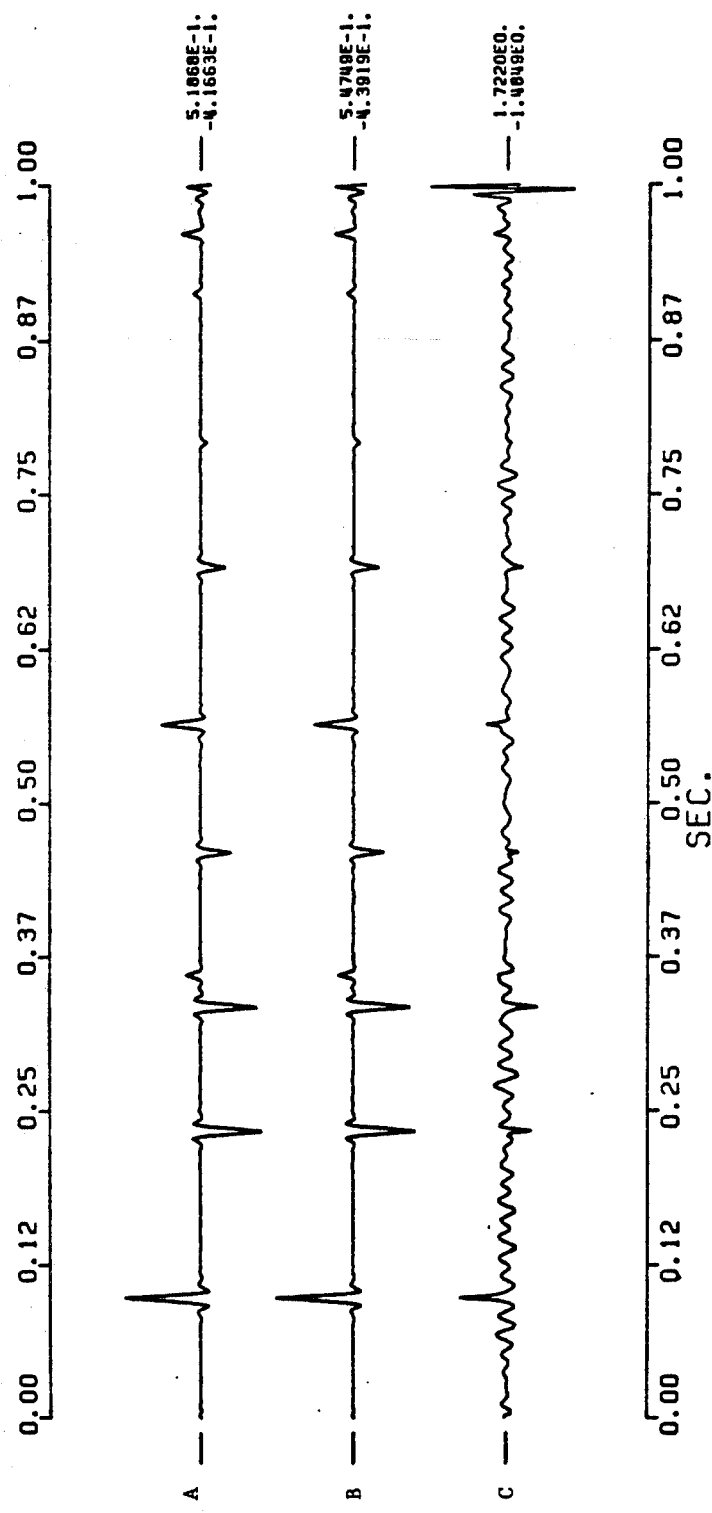
FIG. 9, comprising
Figure 10:
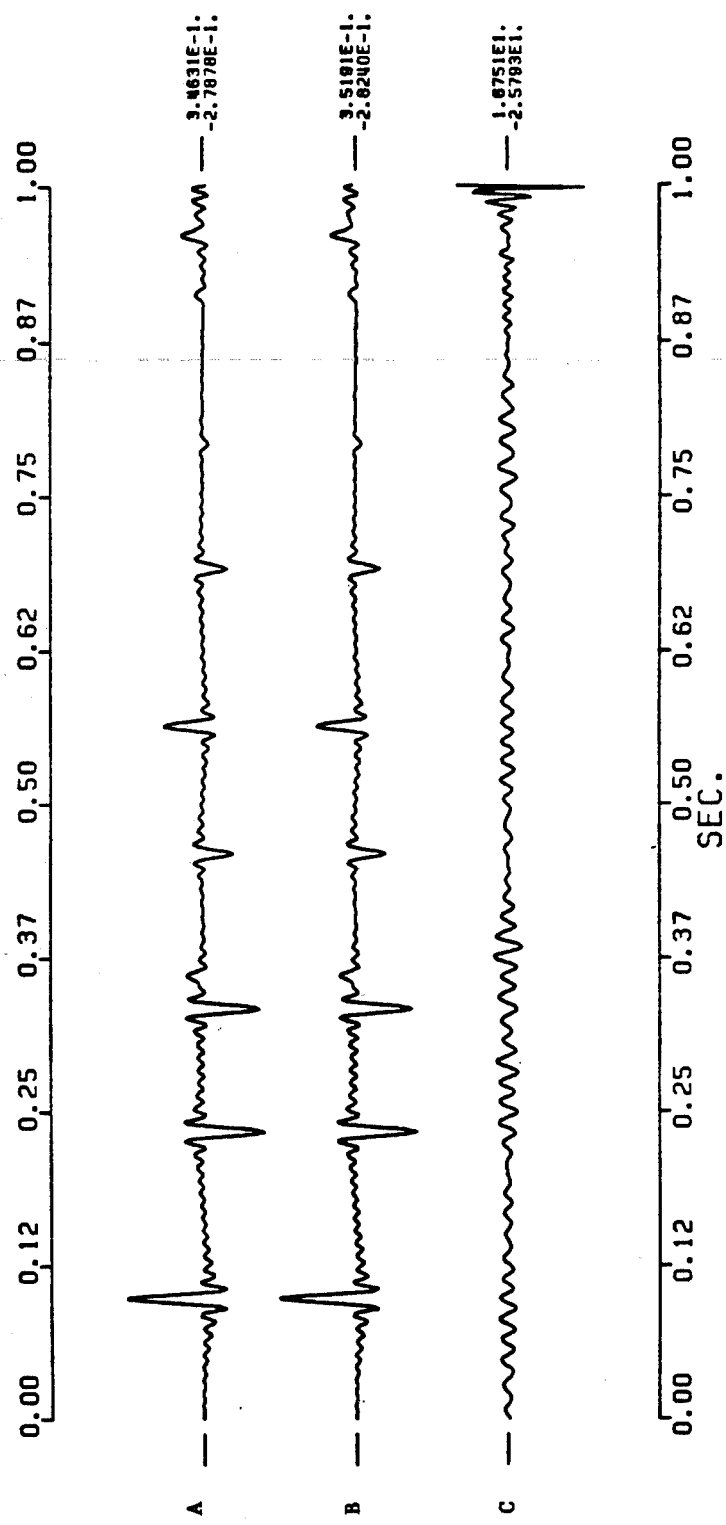
FIG. 10, comprising

FIG. 8 shows ŝ(k) and e(k) generated by the adaptive VSI method of this invention with the data in FIG. 5 as the input. This data set is generated with a tapered sweep. With a prewhitening level of $\delta=1.0$, output SNR's of 3.99 dB and 6.45 dB from the fourth line of Table I are comparable to those described above for the untapered pilot in the first line of Table I. The improvement in SNR$_o$ obtained by the second pass with the final w(k) is evident in Table I and the plots of e(k) in FIG. 8. For the two experiments discussed, the output SNR's are similar, but the final adaptations of the filter w(k) are quite different. FIG. 9A shows the final adaptation for w(k) at the end of the first pass through the data in FIG. 4. FIG. 10A is the final adaptation in the analysis of the data in FIG. 5. As indicated in Table I, the prewhitening factor for both tests is $\delta=1.0$. The only factor differentiating these two tests is the tapering of the pilot used to generate the data in FIG. 5. Before commenting on the differences between FIGS. 9A and 10A, the other plots in the figures will be mentioned.

We define $\xi(y_T)$ according to $$\xi(y_T) \overset{\Delta}{=} \sum_{k=0}^{N_p} y_T^2(k), \qquad (23)$$

where the subscript T indicates the tapered sweep. For the sweep parameters and taper used, $\xi(y_T)=734$. For the final adaptation of w(k) plotted in FIGS. 9B and 10B, the adaptive VSI method of this invention was initiated with δ set at 0.1% of $\xi(y_T)$, i.e., $\delta=0.734$. For plot C of these figures, δ was initiated at 0.01% of $\xi(y_T)$ or $\delta=0.0734$. The output SNR's corresponding to these tests are listed in Table I. Plots A and B of each figure are similar in shape, differing slightly in the peak amplitude reached. The third plot in each figure, plot C, however, indicates that the adaptive method tends to be somewhat unstable. This is also reflected in the SNR$_o$ values listed in Table I for the $\delta=0.0734$ tests. The instability is more severe in the case of the tapered sweep data.

Examining the plots in FIGS. 9A and 10A, we note that the resolution of the reflection events is excellent in FIG. 9A, where the untapered sweep data were analyzed. The wavelets produced at each event contain far less ringing than occurs in the Klauder wavelets produced by the correlation technique. In FIG. 10A, where the tapered pilot was used to generate the data, the final adaptation of w(k) has poorer resolution than the w(k) in FIG. 9A. The oscillations are not quite as severe as those occurring in the correlation technique shown in FIG. 6B, but much of the resolution gained in FIG. 9A has been lost in FIG. 10A.

This discussion shows that the use of a tapered sweep has introduced two problems into the adaptive VSI method of this invention. First, there is a loss of resolution in estimating the impulsive reflection events. The unstable results for $\delta=0.0734$ indicate that the tapered sweep causes the adaptive VSI method to go unstable more quickly than for the untapered sweep.

Figure 11:
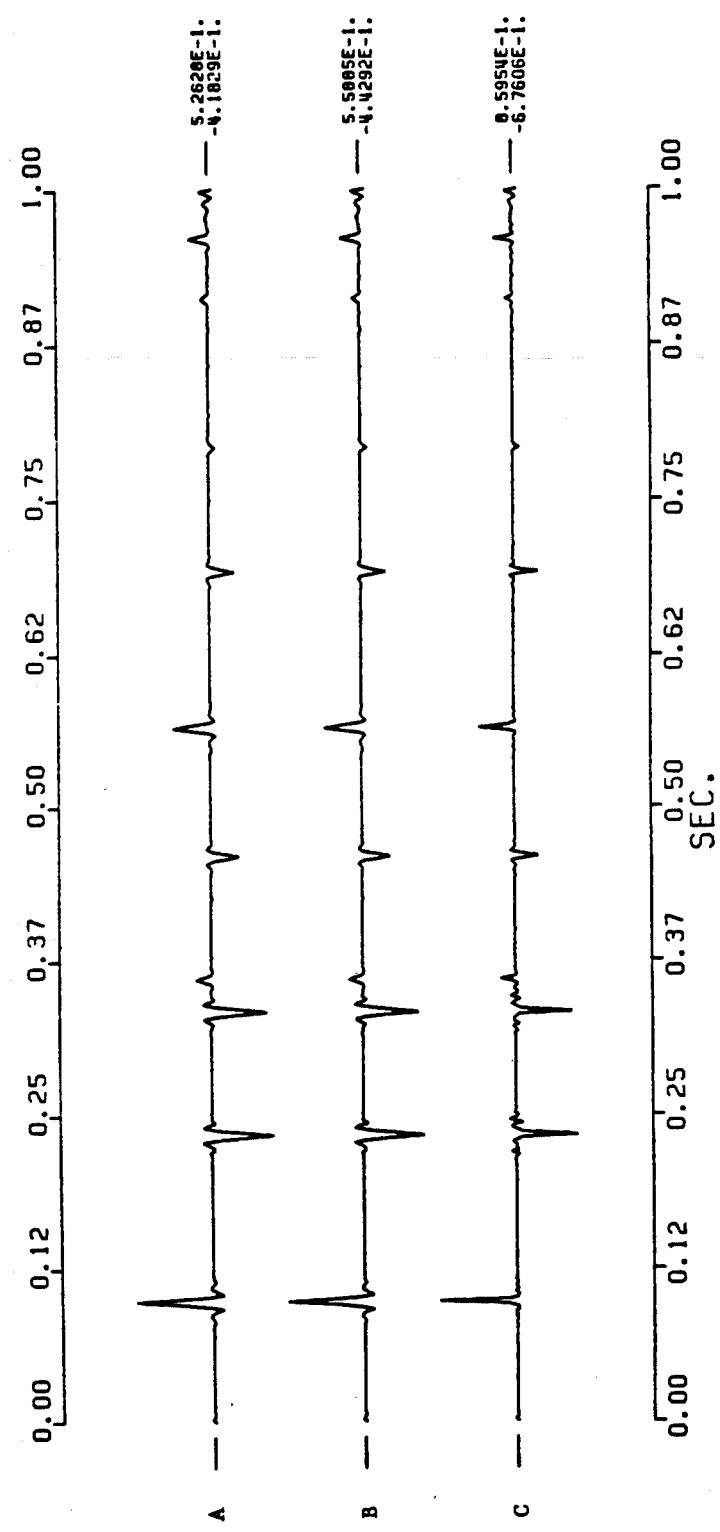
FIG. 11, comprising
Figure 12:
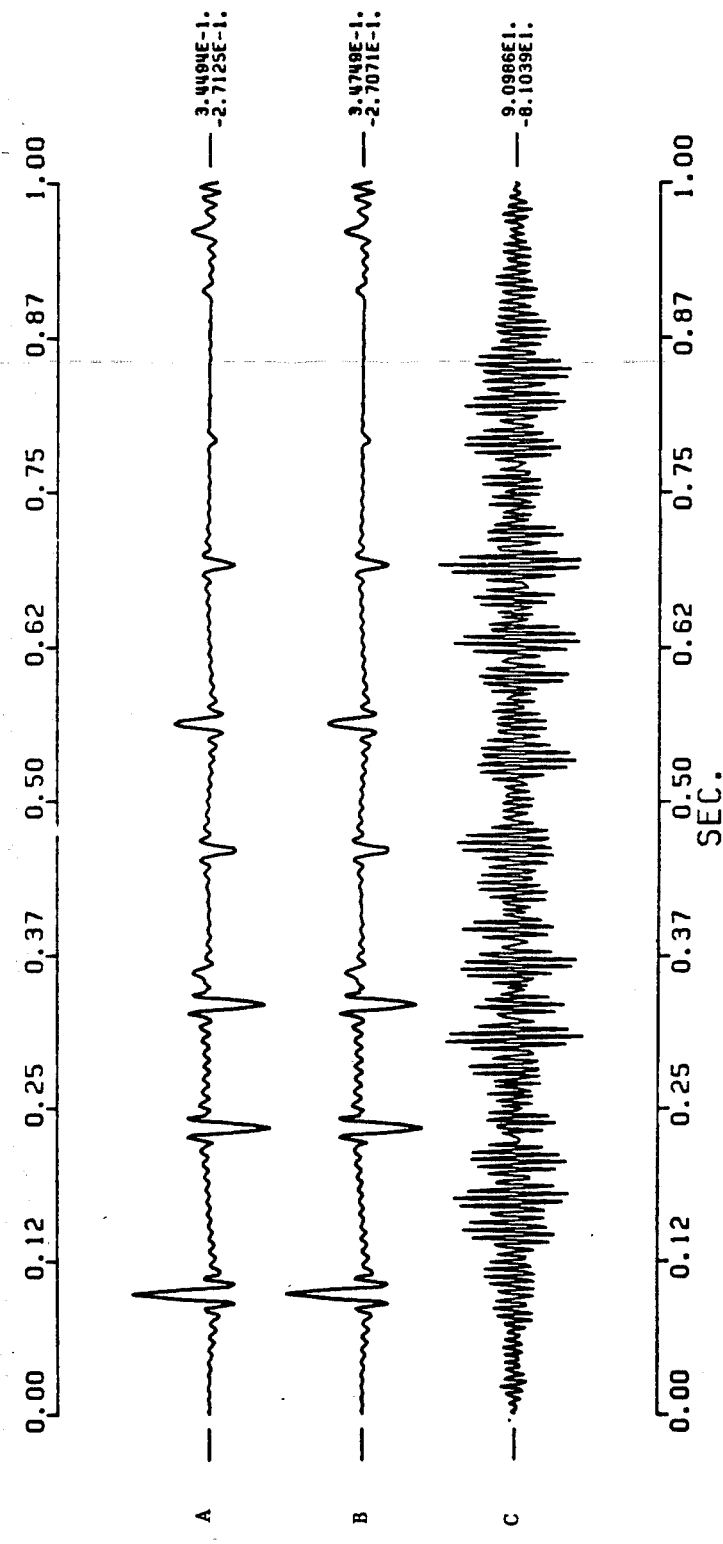
FIG. 12, comprising

The non-adaptive VSI method of this invention was also applied to the two data sets. The prewhitening factor in the non-adaptive VSI method was set at the same values as was done in the adaptive VSI tests described above. With the untapered sweep as the input, the solutions w̄(k) in accordance with the non-adaptive VSI method for the three values of δ are plotted in FIG. 11. Plots A and B are quite similar to their adaptive counterparts in FIG. 9. The result for $\delta=0.0734$ in FIG. 11C, however, is much better than the adaptive solution in FIG. 9C, but it does show some tendency toward instability in the high frequency ringing near some of the events. Applying the non-adaptive VSI method to the tapered data results in the w̄(k) in FIG. 12. The results parallel those of the adaptive solution of FIG. 10, with the instability of the non-adaptive VSI method obvious in FIG. 12C.

Figure 13:
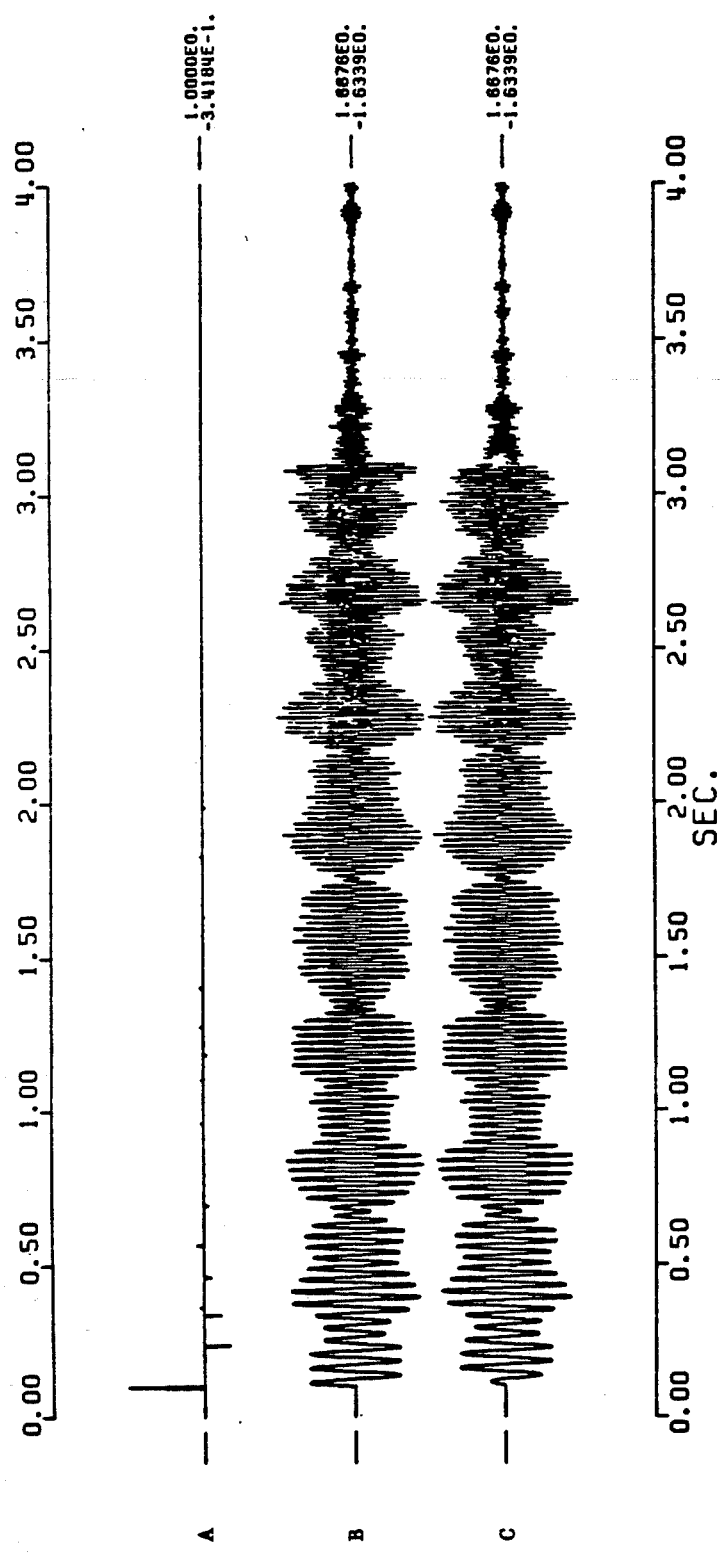
FIG. 13, comprising

The next series of tests used data generated by convolving the sweeps in FIGS. 4 and 5 with a reflection sequence having an exponential decay to the magnitudes of the impulses. FIG. 13 contains the data to be analyzed. Plot A is the reflection sequence h(k), illustrating the lower amplitude in later events. Assuming there is no additive noise, plots B and C of FIG. 13 contain the uncorrelated trace data x(k) obtained by convolving h(k) with the untapered sweep and tapered sweep, respectively. The data in FIGS. 13B and 13C were analyzed with the following procedures:

(1) Correlation technique-correlate x(k) with the appropriate sweep y(k);
(2) Adaptive VSI Method-M=501, $\delta=1.0$;
(3) Non-Adaptive VSI Method-M=501, $\delta=1.0$.

Figure 14:
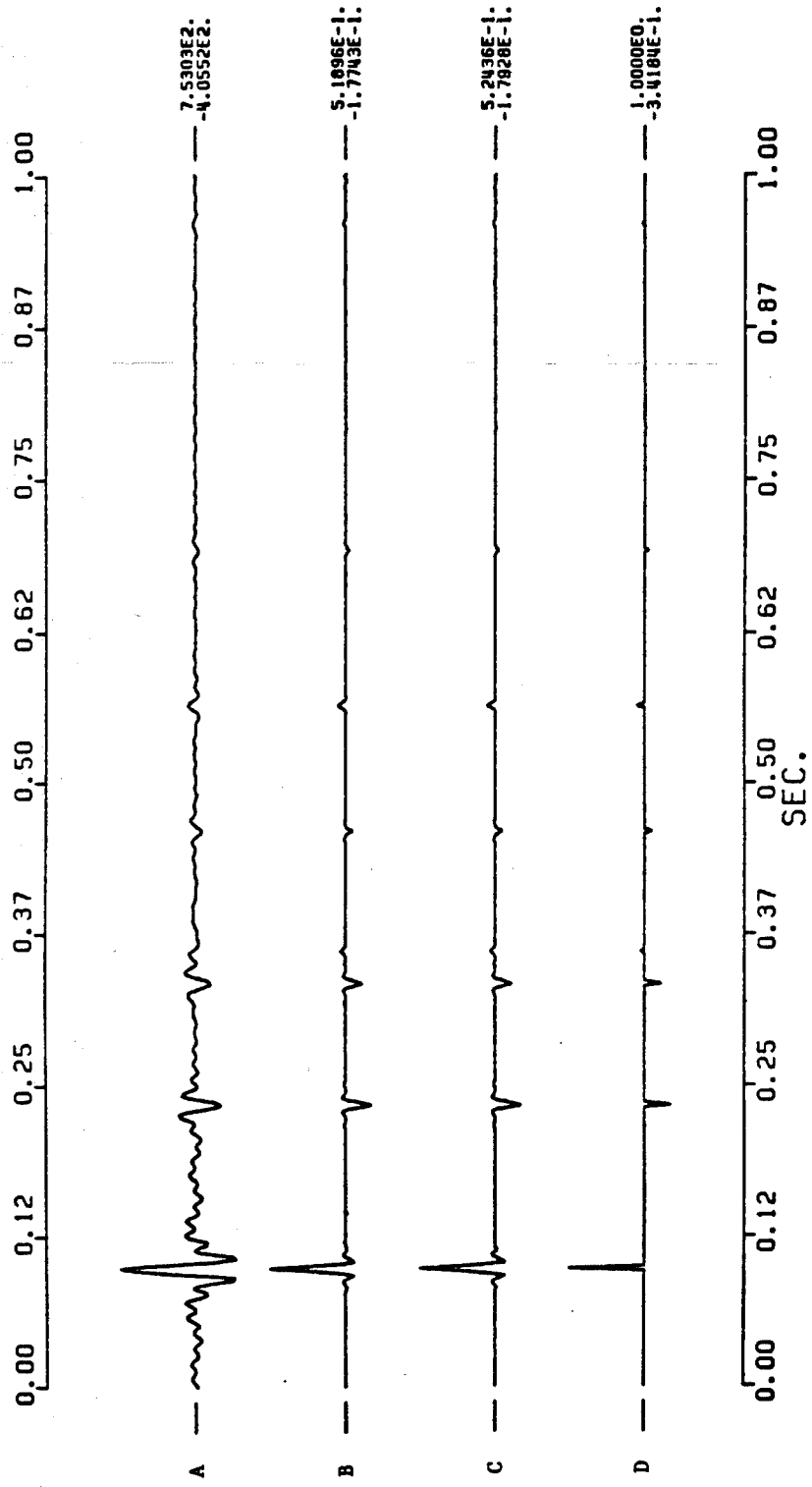
FIG. 14, comprising
Figure 15:
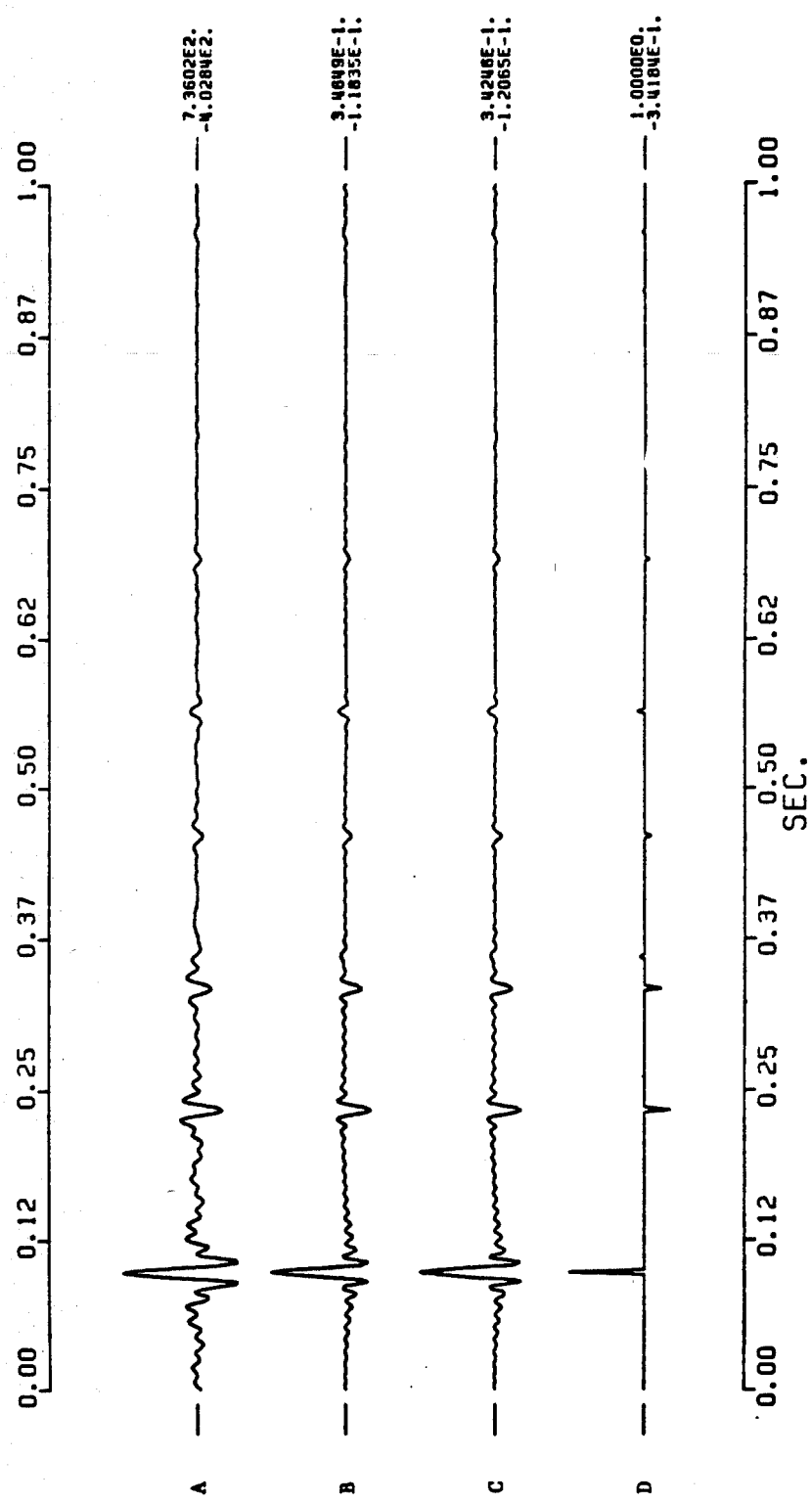
FIG. 15, comprising

The results of applying these three methods to the untapered sweep data of FIG. 13B are presented in FIG. 14, plots A through C. The first second of h(k) is plotted in FIG. 14D for reference. Again, note the superior resolution obtained with the VSI methods of this invention when compared with the correlation results. Because of the exponential decay in magnitude of the reflection sequence, one might use automatic gain control (AGC) to enhance the later events. FIG. 15 shows the plots of FIG. 14 after the application of AGC based on the absolute value of the signal under a time window of 150 msec or 75 samples. AGC amplifies the oscillations which occur in the tails of the Klauder wavelet. This correlation noise obscures details in the later data. Note, for example, the effects of this noise on the events occurring at approximately 0.8 and 0.9 sec. The application of AGC to the VSI-method estimates of h(k) produces much more acceptable results. The superior resolution is still evident, and the lack of oscillations around the estimated impulses prevents the obscuring of adjacent events.

In the analysis of the data in FIG. 5 in the first set of tests, it was noted that use of a tapered pilot degraded the estimate of the reflection sequence. This effect is also observed in analyzing the data of FIG. 13C. The results of the three analysis methods are presented in FIG. 16. Applying AGC, with a window of the same size as in the previous case, gives the plots found in FIG. 17. The results are not as good as those derived from the untapered sweep data, but the VSI methods still provide better resolution after AGC than does the conventional correlation method.

The system identification approach to Vibroseis ® data processing has the potential for improving the resolution of reflection events present in the data. The adaptive VSI method of this invention, preferably implemented with the FKE routine controlling the adaptation, achieves three important goals: (1) it converges rapidly; (2) it is applicable to long transversal filters; and (3) its computational load is proportional to the square of the length of the transversal filter. In the data sets produced with the untapered sweep, the adaptive VSI method of this invention resolves the reflection events much better than the standard correlation technique. Using a tapered sweep degrades the resolution of the adaptive VSI method somewhat, although the results are still noticably better than those obtained from correlation.

The degradation introduced by tapering the sweep also occurs with the non-adaptive VSI method of this invention, which is based on using the Levinson recursive technique to solve a system of normal equations. In the examples presented above, the non-adaptive VSI method method of this invention behaves quite similarly to the adaptive VSI method when considering the prewhitening level and pilot tapering.

The simulations illustrate the ability of the system identification model to resolve reflection events. The tests are performed on synthetic data with no additive noise, allowing the convergence characteristics of the adaptive method to be studied. Both the adaptive and the non-adaptive solutions exhibit instability problems which are eliminated by similar levels of prewhitening. It is also noted that tapering of the vibrator sweep has an adverse effect on stability and resolution.

While the invention has been described with a certain degree of particularity, it is manifest that many changes may be made without departing from the spirit and scope of this disclosure. It is understood that the invention is not limited to the exemplified embodiments set forth herein but is to be limited only by the scope of the attached claims, including the full range of equivalency to which each element thereof is entitled.

What is claimed is:

1. A method for estimating the reflection sequence of the earth from a seismic reflection trace generated by a swept frequency vibrator, including the steps of:
    forming an initial estimate of the reflection sequence from a model of the earth;
    forming an estimated seismic reflection trace from the initial estimate of the reflection sequence from the model of the earth by convolving the initial estimate of the reflection sequence of the earth with a pilot signal of the swept frequency vibrator;
    generating an error signal representative of the difference between an uncorrelated seismic reflection trace and the initial estimated seismic reflection trace; and
    revising the estimate of the reflection sequence of the earth by minimizing the error signal.

2. The method of claim 1 further including forming a revised seismic reflection trace from the revised estimate of the reflection sequence of the earth.

3. The method of claim 1 wherein the step of minimizing the error signal includes converging the estimated seismic trace to the seismic reflection trace by a recursive least squares estimate.

4. The method of claim 1 wherein the step of minimizing the error signal includes converging the estimated seismic trace to the seismic reflection trace by a nonrecursive least squares estimate.

5. A method for improving the resolution of seismic data generated by a swept frequency vibrator, including the steps of:
    detecting seismic reflection signal representative of the earth's impulse response to vibrations imparted into the earth by the swept frequency vibrator;
    forming an initial estimate of the reflection sequence of the earth;
    generating an estimated seismic signal representative of the response of the initial estimate of the reflection sequence of the earth to the vibrations imparted by the swept frequency vibrator by convolving the initial estimate of the reflection sequence of the earth with a pilot signal of the swept frequency vibrator;
    producing an error signal representative of the difference between the seismic reflection signal and the estimated seismic signal;
    minimizing the error signal to produce a revised estimate of the reflection sequence of the earth; and
    forming a revised seismic reflection signal from the revised estimate of the reflection sequence of the earth.

6. The method of claim 5 further including the step of providing a measure of the precision of the revised estimate of the reflection sequence of the earth.

7. An apparatus for improving the resolution of reflection events in seismic data generated with a swept frequency vibrator including:
    means for estimating a reflection sequence for a model of the earth;
    means for convolving the estimated reflection sequence of the earth with a pilot signal of the swept frequency vibrator to form an estimated seismic signal;
    means for producing an error signal representative of the difference between an uncorrelated seismic reflection signal and the estimated seismic signal; and
    means for producing a revised estimate of the reflection sequence of the earth to minimize the error signal such that the estimated seismic signal and the uncorrelated seismic reflection signal converge.

8. The apparatus of claim 7 further including means for providing a measure of the precision of the revised estimate of the reflection sequence of the earth.

9. The apparatus of claim 7 further including means for forming a revised seismic reflection signal from the revised estimated reflection sequence of the earth.

10. The method of claim 1 or 5 wherein the step of estimating the initial estimate of the reflection sequence of the earth comprises initially estimating the reflection sequence of the earth to be zero.

11. The method of claim 5 wherein the step of forming an initial estimate of the reflection sequence of the earth includes initially estimating the reflection sequence of the earth to be zero.

12. A method for estimating the reflection sequence of the earth from a seismic reflection trace generated by a swept frequency vibrator, including the steps of:
    forming a initial estimate of the reflection sequence of the earth according to:

$$w(z) = \sum_{k=0}^{M-1} w(k)z^k$$

where
k = sampling interval and time;
M = number of samples;

$$\sum_{k=0}^{M-1} w(k)z^k = \text{a Z-domain polynomial;}$$

forming an estimated seismic reflection trace from the initial estimate of the reflection sequence of the earth according to:

$$\hat{s}(k) = \sum_{i=0}^{M-1} w(i)y(k-i).$$

where
w(i) = estimated reflection sequence; and
y(k−i) = pilot signal of swept frequency vibrator
generating an error signal representative of the difference between the seismic reflection trace and the initial estimated seismic reflection trace according to:

$$e(k) = x(k) - \underline{w}^T\underline{y}(k)$$

where
$wT = [w(0) \ldots w(M-1)]^T$;
$\underline{y}(k) = [y(k-1) \ldots y(k-M)]$;
x(k) = uncorrelated seismic reflection trace
and revising the estimate of the reflection sequence of the earth by minimizing the error signal according to:

$$L(\underline{w}) = \sum_{k=1}^{n} [x(k) - \underline{w}^T\underline{y}(k)]^2.$$

13. The method of claim 5 further including forming a revised seismic reflection trace from the revised estimate of the reflection sequence of the earth.

14. The method of claim 5 wherein the step of minimizing the error signal includes converging the estimated seismic trace to the seismic reflection trace by a recursive least squares estimate.

15. The method of claim 5 wherein the step of minimizing the error signal includes converging the estimated seismic trace to the seismic reflection trace by a nonrecursive least squares estimate.

* * * * *

UNITED STATES PATENT OFFICE
CERTIFICATE OF CORRECTION

PATENT NO. : 4,630,242
DATED : December 16, 1986     Page 1 of 2
INVENTOR(S) : William J. Done It is certified that error appears in the above-identified patent and that said Letters Patent are hereby corrected as shown below:

Column 3, line 67, "s(k)" should read --$\hat{s}$(k)--.

Column 5, line 28, "$\hat{s}$(k)" should read --s(k)--; line 64 (formula #3), "$w^T y$" should read "$\underline{w}^T \underline{y}$"; line 66, following where "w" should read "$\underline{w}$"; line 66, "y(k)" should read "$\underline{y}$(k)"; line 68, "y(k)" should read "$\underline{y}$(k)".

Column 7, line 27 (formula #9), "$\sim$" should read "$\cong$"; line 55 (equation #1), "$a^T(n-1)y(n)$" should read "$\underline{a}^T(n-1)\underline{y}(n)$"; line 57 (equation #2), "a(n)=a(n-1)-c(n)" should read "$\underline{a}(n)=\underline{a}(n-1)-\underline{c}(n)$"; line 59 (equation #3), "$+a^T(n)y$" should read "$+\underline{a}^T(n)\underline{y}$".

Column 8, line 7 (equation #7), "$d^T(n-1)y$" should read "$\underline{d}^T(n-1)\underline{y}$"; line 9 (equation #8), "d(n) =[d(n-1)-$\gamma$" should read "$\underline{d}(n)=[\underline{d}(n-1)-\underline{\gamma}$"; line 11 (equation #9), "c(n+1)=$\gamma$(n)-$\mu$(n)d(n)" should read "$\underline{c}(n+1)=\underline{\gamma}(n)-\mu(n)\underline{d}(n)$"; line 15 (equation #10), "$w^T(n)y$" should read "$\underline{w}^T(n)\underline{y}$"; line 16 (equation #11), "$\mu$(n+1)" should read "u(n+1)"; line 18 (equation #12), "w(n+1)=w(n)+c" should read "$\underline{w}(n+1)=\underline{w}(n)+\underline{c}$"; lines 27-33, $$y(n)\begin{Bmatrix} y(n) \\ y(n-1) \\ \vdots \\ y(n-M+1) \\ y(n-M) \end{Bmatrix} y(n+1).$$

should be $$\underline{y}(n)\begin{Bmatrix} y(n) \\ y(n-1) \\ \vdots \\ y(n-M+1) \\ y(n-M) \end{Bmatrix} \underline{y}(n+1).$$

Column 10, line 30, "$R_{yy}$" should read "$\tilde{R}_{yy}$"; line 36, "$RHD_{yy}$" should read "$\underline{R}HD_{yy}$"; line 49 (formula #18) "$\tilde{w}$" should read "$\underline{\tilde{w}}$".

Column 11, line 40 (formula #21) "$f_1 t =$" should read "$f_1 t +$"

UNITED STATES PATENT OFFICE
CERTIFICATE OF CORRECTION

PATENT NO. : 4,630,242

DATED : December 16, 1986   Page 2 of 2

INVENTOR(S) : William J. Done

It is certified that error appears in the above-identified patent and that said Letters Patent are hereby corrected as shown below:

Column 12, line 50, "s(k)" should read "$\hat{s}(k)$".

Signed and Sealed this

Twenty-first Day of June, 1988

Attest:

DONALD J. QUIGG

*Attesting Officer*   *Commissioner of Patents and Trademarks*